United States Patent [19]
Andert et al.

[11] Patent Number: 5,864,668
[45] Date of Patent: Jan. 26, 1999

[54] SYSTEM FOR CONNECTING A CLIENT TO A SERVER WITH A PROTOCOL STACK DYNAMICALLY CONSTRUCTED BY USING TOP AND BOTTOM SERVICE DESCRIPTIONS AS QUERY PARAMETERS

[75] Inventors: Glenn P. Andert, Cupertino; George William Norman, Fremont, both of Calif.

[73] Assignee: Object Technology Licensing Corp., Cupertino, Calif.

[21] Appl. No.: 633,910

[22] Filed: Apr. 17, 1996

Related U.S. Application Data

[63] Continuation of Ser. No. 171,721, Dec. 21, 1993, Pat. No. 5,548,779.
[51] Int. Cl.$^6$ .............................. G06F 13/14; G06F 13/42
[52] U.S. Cl. ................................ 395/200.33; 395/200.57; 395/200.6; 395/831; 395/682; 395/684
[58] Field of Search ............................... 395/200.33, 831, 395/155, 682, 684, 200.69, 650, 200.57

[56] References Cited

U.S. PATENT DOCUMENTS

| | | | |
|---|---|---|---|
| 4,407,016 | 9/1983 | Bayliss et al. | 364/200 |
| 4,530,052 | 7/1985 | King et al. | 364/200 |
| 4,597,044 | 6/1986 | Circello | 364/200 |
| 4,821,220 | 4/1989 | Duisberg | 364/578 |
| 4,953,080 | 8/1990 | Dysart et al. | 364/200 |

(List continued on next page.)

OTHER PUBLICATIONS

Christian Tschudin, University of Geneva, Centre Universitaire d'Informatique, "Flexible Protocol Stacks," Sep. 21, 1991, No. 4, New York, US, pp. 197–205.
"Using Traders for Autonomous Service Provision in Intelligent Networks", Eckardt et al, IEEE, pp. 93–99, Feb. 1993.
"Federating ODP Traders: An X.500 Approach", Popien etal, IEEE, pp. 313–317, Feb. 1993.

"Some New Performance Considerations in Open Distributed Environments", Milosevic et al, IEEE, pp. 961–965, Feb. 1993.
"On Some Performace Issues for Open Services Support in Future Networks", Phillips et al, IEEE, pp. 815–819, Feb. 1992.
Dumas, Joseph and Paige Parsons. "Discovered the Way Programmers Think: New Programming Environments." *Communications of the ACM.* Jun. 1995: pp. 45–56.
Pascoe, Geoffrey A. "Encapsulators: A New Software Paradigm in Smalltalk–80." OOPSLA '86 Proceedings, Sep. 1986: pp. 341–346.
Purrilo, James M. and Joanne M. Atlee, "Module Reuse by Interface Adaptation." *Software —Practice and Experience.* Jun. 1991: pp. 539–555.
Lam, Siman S. "Protocol Conversion." *IEEE Transactions on Software Engineering* Mar. 1988: pp. 353–362.
Thatte, Satish R. "Automated Synthesis of Interface Adapters for Reusable Classes." *POPL '94.* Jan. 1994: pp. 174–187.
Yellin, Daniel M. and Robert E. Strom. "Interfaces, Protocols, and the Semi–Automatic Construction of Software Adaptors." *OOPSLA '94.* Oct. 1994: pp. 176–190.

(List continued on next page.)

*Primary Examiner*—Thomas C. Lee
*Assistant Examiner*—Rehana Perveen
*Attorney, Agent, or Firm*—Kudirka & Jobse; James A. Ward

[57] ABSTRACT

A method and system for providing services in an object oriented system. The method and system are in the form of an interface reference framework of objects which create services in response to requests. Clients request services which are created in response to the requests. In response to the request the framework first develops a description of the service. The description is in the form of a stack of descriptions of services. From the stack descriptions the actual services are created by maker objects.

15 Claims, 22 Drawing Sheets

U.S. PATENT DOCUMENTS

| | | | |
|---|---|---|---|
| 5,041,992 | 8/1991 | Cunningham et al. | 364/518 |
| 5,050,090 | 9/1991 | Golub et al. | 364/478 |
| 5,060,276 | 10/1991 | Morris et al. | 382/8 |
| 5,075,847 | 12/1991 | Fromme | 395/700 |
| 5,075,848 | 12/1991 | Lai et al. | 395/425 |
| 5,093,914 | 3/1992 | Coplien et al. | 395/700 |
| 5,119,475 | 6/1992 | Smith et al. | 395/156 |
| 5,125,091 | 6/1992 | Staas et al. | 395/650 |
| 5,129,084 | 7/1992 | Kelly, Jr. et al. | 395/650 |
| 5,133,075 | 7/1992 | Risch | 395/800 |
| 5,151,987 | 9/1992 | Abraham et al. | 395/575 |
| 5,181,162 | 1/1993 | Smith et al. | 364/419 |
| 5,212,787 | 5/1993 | Baker et al. | 395/600 |
| 5,226,117 | 7/1993 | Miklos | 395/157 |
| 5,257,369 | 10/1993 | Skeen et al. | 395/650 |
| 5,265,239 | 11/1993 | Ardolino | 395/500 |
| 5,287,541 | 2/1994 | Davis et al. | 455/12.1 |
| 5,297,283 | 3/1994 | Kelly, Jr. et al. | 395/650 |
| 5,297,284 | 3/1994 | Jones et al. | 395/700 |
| 5,315,703 | 5/1994 | Matheny et al. | 395/164 |
| 5,317,741 | 5/1994 | Schwanke | 395/700 |
| 5,325,533 | 6/1994 | McInerney et al. | 395/700 |
| 5,327,562 | 7/1994 | Adcock | 395/700 |
| 5,333,319 | 7/1994 | Silen | 395/650 |
| 5,339,430 | 8/1994 | Lundin et al. | 395/700 |
| 5,339,438 | 8/1994 | Conner et al. | 395/700 |
| 5,341,477 | 8/1994 | Pitkin et al. | 395/200 |
| 5,369,770 | 11/1994 | Thomason et al. | 395/725 |
| 5,421,016 | 5/1995 | Conner et al. | 395/700 |
| 5,423,023 | 6/1995 | Batch et al. | 395/500 |
| 5,428,792 | 6/1995 | Conner et al. | 395/700 |
| 5,432,925 | 7/1995 | Abraham et al. | 395/500 |
| 5,437,027 | 7/1995 | Bannon et al. | 395/600 |
| 5,515,508 | 5/1996 | Pettus et al. | 395/200.01 |
| 5,548,726 | 8/1996 | Pettus | 395/200.09 |

OTHER PUBLICATIONS

Jacobson, Ivar and Fedrick Lindstrom. "Re–engineering of old systems to an object–oriented architecture." *OOPSLA '91* pp. 342–353.

Filman, Robert E. "Retroffiting Objects." *OOPSLA '87* Oct. 1987: pp. 342–353.

Dietrich, Walter C. Lee R. Nackman and Franklin Cracer. "Saving a Legacy with Objects." *OOPSLA '89*. Oct. 1989: 77–83.

Dotts, Alan and Don Birkley. "Development of Reusable Test Equipment Software Using Smalltalk and C." *OOPSLA '92*. Oct. 1992: pp. 31–35.

Duntemann, Jeff and Chis Marinacci. "New Objects for Old Structures." *BYTE*. Apr. 1990: pp. 261–266.

Alabiso, Bruno. "Transformation of Data Flow Analysis Models to Object–Oriented Design." *OOPSLA '88*. Sep. 1988: 335–353.

Madhavji, Nazim H. Jules Desharnais, Luc Pinsonneault, and Kamel Toubache. "Adapting Modules to an Integrated Programming Environment." *IEEE International Conference on Programming Languages*. 1988: pp. 364–371.

Dutt, Nickil D. "Legend: A Language for Generic Component Library Description." *IEEE International Conference on Computer Languages*. 1990: 198–207.

SYSTEM FOR CONNECTING A CLIENT TO A SERVER WITH A PROTOCOL STACK DYNAMICALLY CONSTRUCTED BY USING TOP AND BOTTOM SERVICE DESCRIPTIONS AS QUERY PARAMETERS

This is a continuation of application Ser. No. 08/171,721 filed Dec. 21, 1993 (now U.S. Pat. No. 5,548,779).

FIELD OF THE INVENTION

This invention generally relates to improvements in computer systems, and more particularly to a system and method for service creation in an object oriented operating system.

BACKGROUND OF THE INVENTION

Computer systems in general are very rigid. Application developers and users of the system must often know intimate details of hardware protocol and configurations in order to provide a system in which information flows smoothly. Details of each particular type of port and IO device must be dealt with on an individual basis. Application developers and users must also be kept constantly abreast of each change in the system in order to provide corresponding changes to the software and hardware so that the changes can be taken full advantage of.

The rate at which IO devices change, as well as the rate of change of intermediate elements which are used to transfer information to and from an IO device, is extremely fast. Each change requires a learning process of system users so that the system may be kept performing in an optimum manner.

A computer system can be thought of as a large collection of clients which need services performed. Clients could be considered to be virtually any part of the system which may need something. For example, the CPU could be considered to be a client which needs a service performed by a particular element in the system. The performance of the service may involve many steps, and many elements to provide the requested service. A service could be considered to be anything which provides something which is needed by another entity in the system. For example, a particular chip may provide a particular type of digital signal processing as a service for another system element. A single element could at one time be a client, and at another time provide a service to a client.

The interplay of clients and services often requires great attention by developers and users in order to make the requests for services, and providing of services, a smooth process. The protocol for requests and providing is often very inflexible, and requires intervention in minute details to change the protocol. In many respects, requests for services and providing services could be considered to be set in stone.

There is therefore, a need to provide a flexible system for requesting and providing services. The system needs to overcome the above difficulties concerning the level of detail involved, the problems associated with system changes, and the overall rigidity of software and hardware between clients and service providers.

SUMMARY OF THE INVENTION

Accordingly, it is a primary object of the present invention to provide a system and method for improving the interaction between clients and services.

It is another object of the present invention to provide a system and method for improving the flexibility in adjusting to changes in a system of clients and service providers.

It is yet another object of the present invention to provide a system and method for allowing requests for services without concern for details of the service requested.

It is another object of the present invention to provide a system and method for allowing requests for services without concern for details of the service provider.

These and other objects are realized by an interface framework which creates services in response to a request. The system receives an interface reference, and from the reference creates a previously nonexistent service. The interface reference creates in interface maker, which performs the actual creation and activation of a requested service. Activation of the service can be thought of as a two step process in which a service stack description is created, and from this description a service stack is created.

The interface reference is an entity which encapsulates all information necessary to create a service. The client has the interface reference, and activates the reference to create the service which is needed. The interface reference first creates a service stack description by determining the service interfaces which make up the top and bottom of the service stack, and then searching to find a set of services between the top and bottom interfaces which will form the required service stack. The interface maker serves the purpose of "buffering" service provider classes from the service stack framework.

From the service stack description interface makers corresponding to the stack description are created. This creation occurs from the bottom of the description up. The service stack description can be thought of as a list of references to interface makers.

DETAILED DESCRIPTION OF THE INVENTION

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as the basis for the claims and as a basis for teaching one skilled in the art how to make and/or use the invention.

The history of object-oriented programming and the developments of frameworks is well-established in the literature. C++ and Smalltalk have been well-documented and will not be detailed here. Similarly, characteristics of objects, such as encapsulation, polymorphism and inheritance have been discussed at length in the literature and patents For an excellent survey of object oriented systems, the reader is referred to "Object Oriented Design With Applications" by Grady Booch.

While many object oriented systems are designed to operate on top of a basic operating system performing rudimentary input and output, the present system is used to provide system level support for particular features. It should be kept in mind, however, that innovative objects disclosed herein may also appear in layers above the system level in order to provide object support at different levels of the processing hierarchy.

Figure 1:
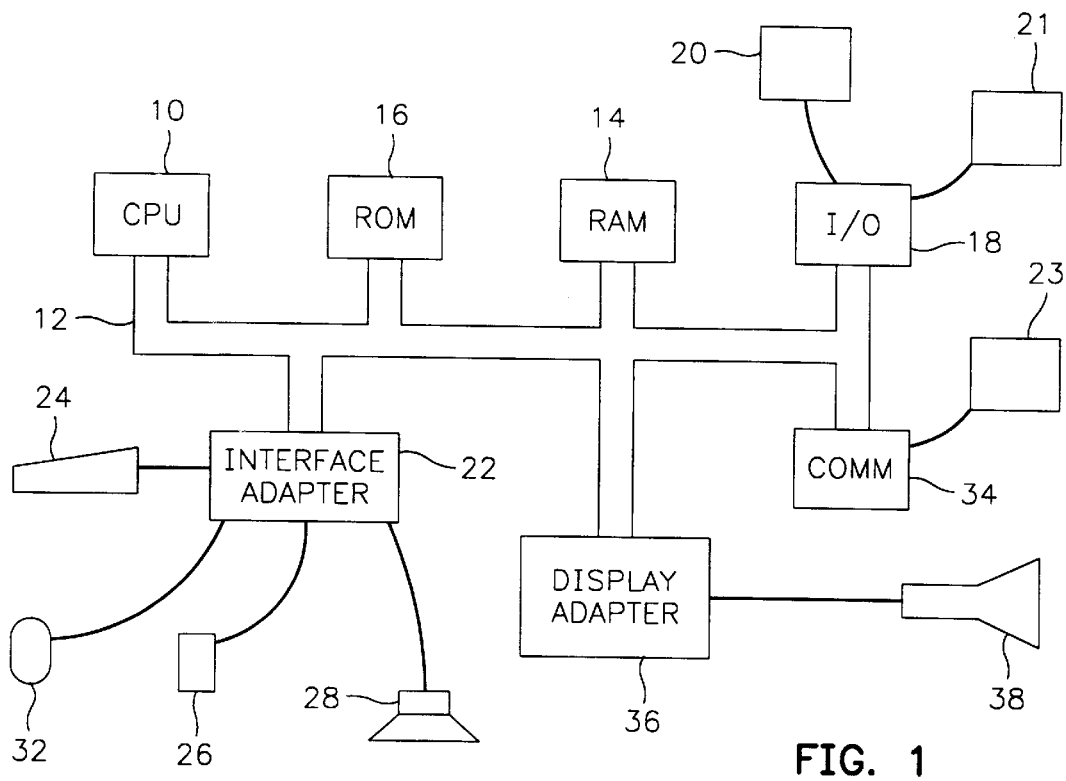
FIG. 1 illustrates a typical hardware configuration of a computer in accordance with the subject invention.

The invention is preferably practiced in the context of an operating system resident on a personal computer such as the IBM® PS/2® or Apple® Macintosh® computer. A representative hardware environment is depicted in FIG. 1, which illustrates a typical hardware configuration of a computer in accordance with the subject invention having a central processing unit 10, such as a conventional microprocessor, and a number of other units interconnected via a system bus 12. The computer shown in FIG. 1 includes a Read Only Memory (ROM) 16, a Random Access Memory (RAM) 14, an I/O adapter 18 for connecting peripheral devices such as disk units 20 and other I/O peripherals represented by 21 to the system bus 12, a user interface adapter 22 for connecting a keyboard 24, a mouse 32, a speaker 28, a microphone 26, and/or other user interface devices such as a touch screen device (not shown) to the bus 12, a communication adapter 34 for connecting the workstation to a data processing network represented by 23. A display adapter 36 for connecting the bus to a display device 38. The workstation has resident thereon an operating system such as the Apple System/7® operating system.

The following discussion will describe the requirements, client needs and classes provided by a preferred embodiment of the present invention, which will herein be referred to as the "Interface Reference framework."

The Interface Reference framework is designed to provide advances which impact a variety of segments of the computer industry:

1. Designers and developers of the "Computer Viewer", "Low-level hardware configuration framework" and "Network browser".

2. Developers of new types of TModelSurrogates which appear in the computer viewer and network browser.

3. Developers of services (e.g. CAMs, DAMs, Device Channels).

The Interface Reference framework is designed to address needs of developers who want to isolate themselves from the details of how services are created. Developers who use the Interface Reference framework can shield their clients from rudimentary service creating techniques, such as message streams. All of these details are encapsulated by the Interface Reference framework.

The first benefit of the Interface Reference framework is that it provides an abstraction which insulates clients from the details of how services are created. An instance of a subclass of TInterfaceReference represents the ability to create and use a service for a particular device, with an interface specified by the client. In c++, the client typically specifies the interface by just instantiating a particular class. Consider a client who requires a TImageWriter service. There may be lots of concrete TImageWriter service classes available, such as TImageWriterOn Serial, TImageWriterOnParallel, TImageWriterOnMessageStream, TImageWriterOnSCSI. Each of these concrete classes supports the TImageWriter interface. Which one do you choose? The only way you can choose is to know something about where the device is actually connected. But you don't want to know that type of detail. So, we encapsulate this knowledge inside of the interface reference. It determines for you which of the concrete classes to instantiate all the way down to the "metal." For example, consider an ImageWriter. It may be connected to any serial or parallel port on a computer, or even to the network. Each case requires creating a different set of services in order to communicate with the printer. The Interface Reference framework insulates clients from the details of how the Imagewriter is connected and how the services to access the ImageWriter are created.

Figure 2:
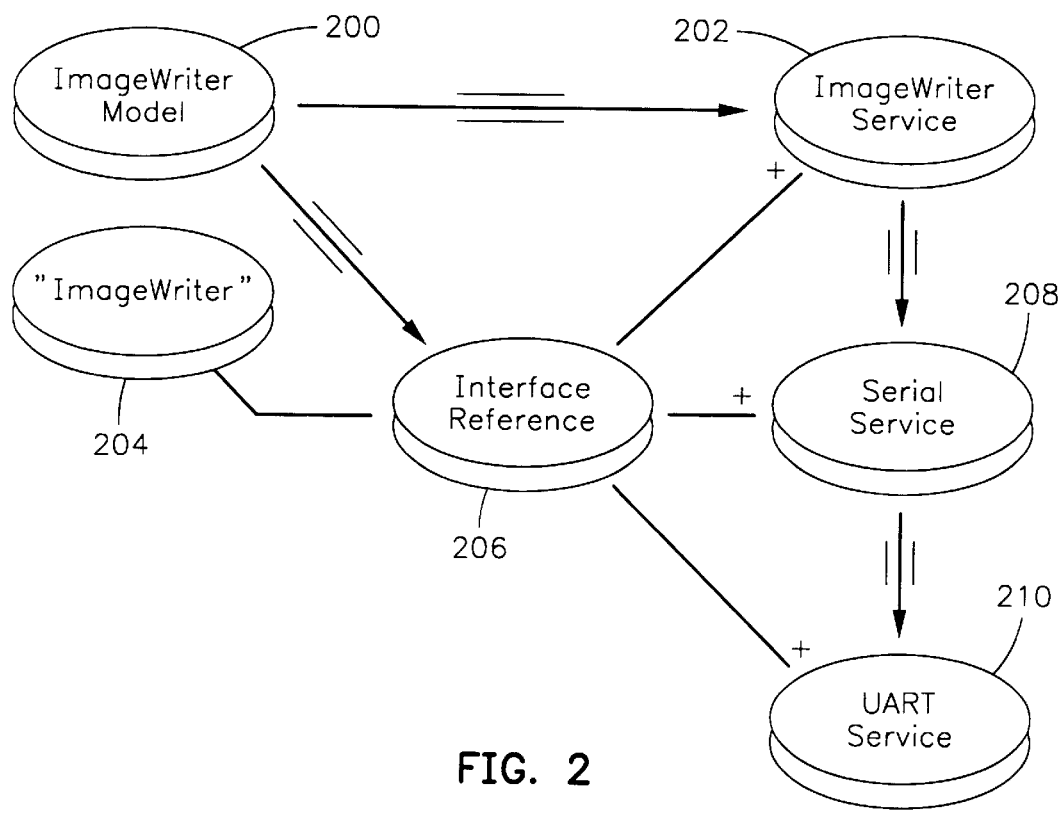
FIG. 2 is a diagram showing a client using an interface reference.

FIG. 2 presents a high-level scenario of a client 200 (an ImageWriter TModel object) that requires an "ImageWriter" service 202. In FIG. 2, an arrow having a line on both sides indicates message sending which sets up a collaboration. A plain line with a "+" at one end means creation.

The client is given an interface reference 206 to an ImageWriter 204 connected to a built-in serial port on the system. The client sets "ImageWriter" 204 as the top interface and activates the interface reference 206. This causes an ImageWriter service 202 to be created and returned for the target printer. The ImageWriter service 202 itself happens to require a serial service 208. Furthermore, the serial service 208 requires a UART service 210. The ImageWriter TModel object 200 is oblivious to the needs of any of these services. The advantage of this scenario is that the computer viewer and the network browser can both create the same model using the same constructor. This simplifies the model writer's job because he is only required to write one model, not two.

Figure 3:
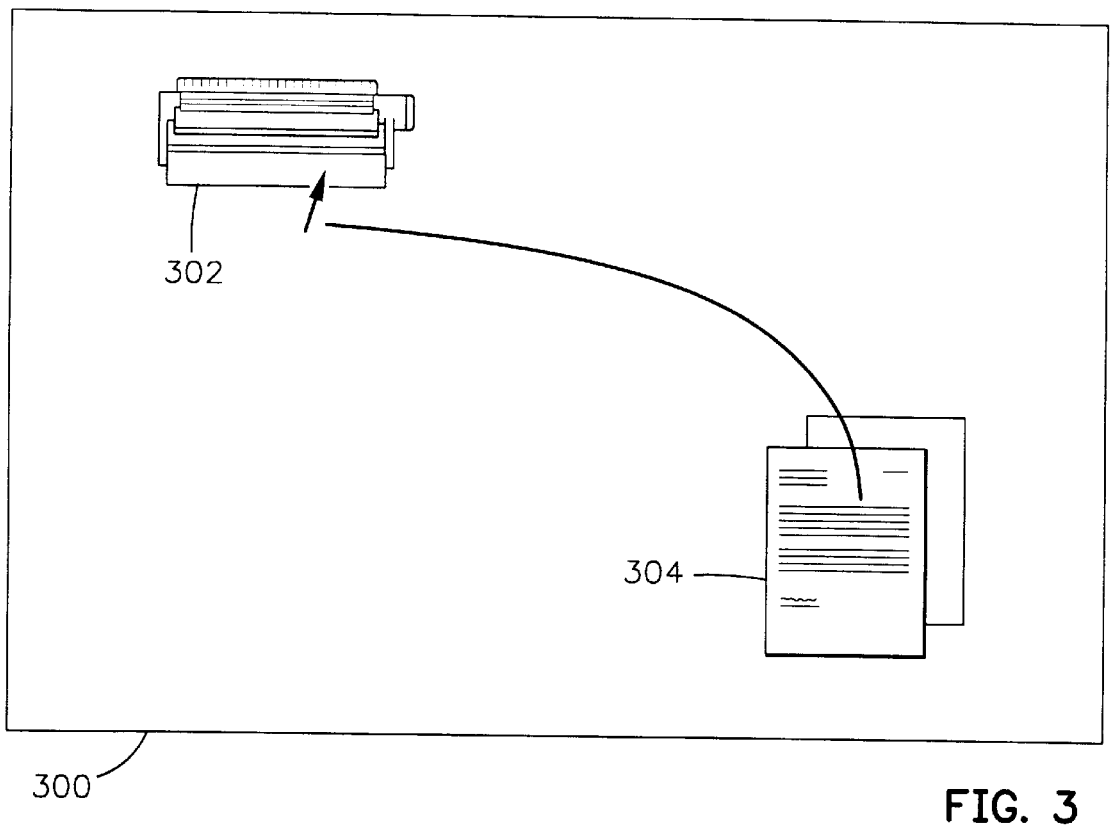
FIG. 3 is a representation of a drag and drop operation.

A second benefit of the Interface Reference framework is that service associations are guaranteed to remain valid after a user changes a connection via the computer viewer. For example, as shown in FIG. 3, a user of a graphics interface 300 can drop a printer 302 onto a document 304. This "associates" the document 304 with the printer service. The document 304 uses this printer 302 whenever the default document print command is issued. If the printer's connection is changed, all of the documents which are "associated" with it will still print to the same printer. If this was not supported, then the user would be required to fix each document affected by the modified connection.

A third benefit is that service associations with documents persist across reboots of the system. When the system is rebooted, all of these associations remain valid.

Service Stack: A service stack is a series of services, piled one on top of the other. Each service in the stack exports exactly one interface to a client and expects to use exactly one service below it. The following discussion and diagrams illustrate service stacks. Each box represents a service.

Figure 4:
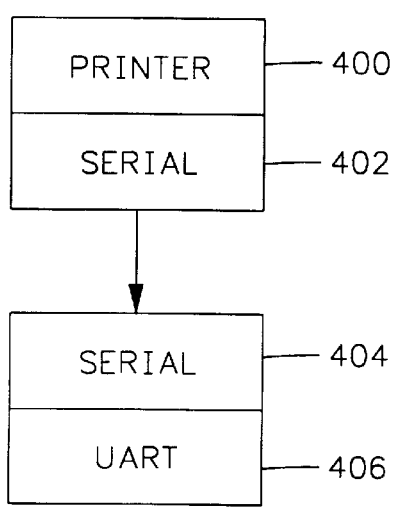
FIG. 4 shows service stacks associated with a printer and serial data transfer.
Figure 5:
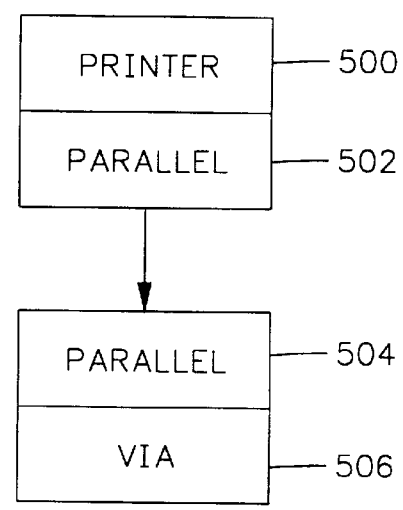
FIG. 5 shows service stacks associated with a printer and parallel data transfer.
Figure 6:
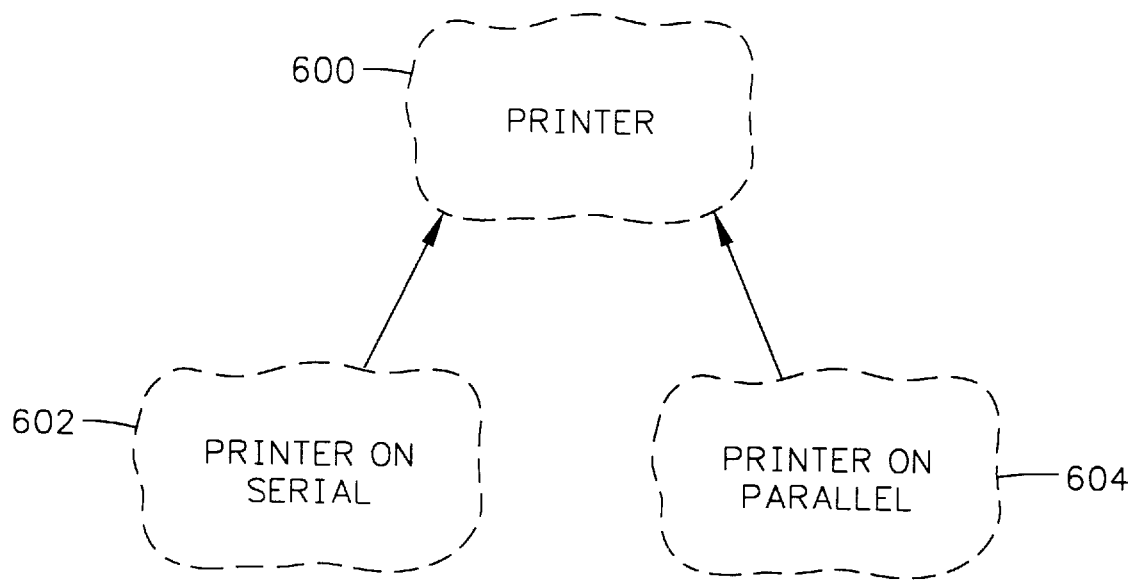
FIG. 6 is a Booch diagram showing the relationships among the services for a printer.
Figure 7:
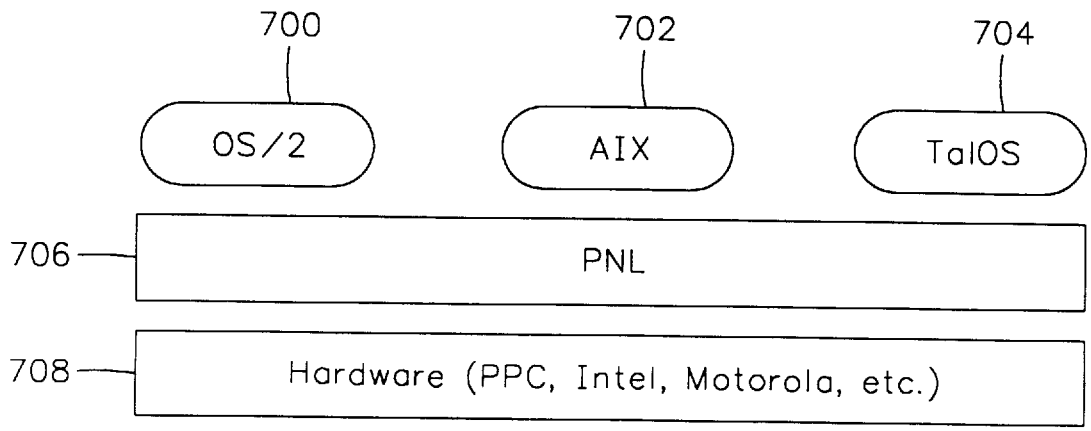
FIG. 7 is a block diagram illustrating the concept of a personality neutral layer in accordance with the present invention acting as an interface between operating systems and hardware.

The top box 400 in FIG. 4 represents a service that exports "printer" as its interface to clients. It requires the service "serial" 402/404 below it in order to fulfill its "printer" interface obligations. The top box 500 in FIG. 5 represents a different service than the top box 400 in FIG. 4. Its exported interface is the same, but it demands a different interface, parallel 502/504, below. As shown in FIG. 6, these two services 602, 604 are actually subclasses of a common abstraction 600. This structure allows the client of the top service ("printer" in this case) to be reused across a variety of lower level services. A key purpose of the mechanisms described with respect to the Interface Framework of the present invention is to allow the automatic creation of such stacks, to maximize reuse of higher-level clients.

Top Interface: The interface that a client uses when accessing (or using) a service is called its top interface. In the example above, "Serial" 404 is the top interface of the <Serial, UART> service. "Parallel" 504 is the top interface of the <Parallel, VIA> service.

Bottom Interface: The interface that a service provider uses in order to fulfill its "top" interface responsibilities is called its bottom interface. In the example above, "UART" 406 is the bottom interface of the <Serial, UART> service. "VIA" 506 is the bottom interface of the <Parallel, VIA> service.

Access Manager: An Access Manager is an IO service which can talk directly to a physical hardware component (e.g. an integrated circuit). It handles arbitration between multiple requests to access the hardware.

Requirements

Following is the complete list of requirements for the Interface Reference framework:

Support for polymorphic creation of services: An extensible mechanism is required which can shield consumers of services from the details of how those services are created. The consumer must not need to know if the service is provided remotely or locally. Furthermore, the consumer of local services must not need to know what type of port the service is using (e.g. serial or SCSI) or to which particular port the service is connected (e.g. modem port or printer port).

Allow clients to specify the service interface they want to use: All services export an interface to their clients. The Interface Reference framework must provide a mechanism which enables clients to specify the interface they want.

Ability to reestablish a service if a "connection" changes: When a connection to a local device changes, an appropriate new service must be created. For example, if a printer is currently connected to serial port 1 and a user moves the connection to parallel port 2, a new service, using parallel port 2, must be created.

Support for persistent service associations: A service (e.g. an ImageWriter II icon) can be associated with a document model. It is important that the Interface Reference framework allow clients to preserve the associations users make between services and documents.

Ability to calculate a description of a service: A service description consists of all of the information necessary to create a particular service stack. A service description may be calculated at any time. As an optimization, it may be cached.

Support for lazy activation: A service stack may be created from a service description at any time. This allows clients of the Interface Reference to defer creating a service until the service is actually required. For example, a document model could have an interface reference to a printer. The creation of the printer service stack could be deferred until the time the user requests the document to print.

Support for multiple stacks per 10 port with arbitration at the bottom: More than one stack, for a given IO port, must be allowed to exist concurrently. The arbitration for the hardware resource (i.e. the chip) is handled by the access manager at the bottom.

Stack activation must take advantage of newly "installed" software: Each time a service stack is activated (i.e. created), it must incorporate the latest version of any service that is a member of the stack.

Features

Following are the features of the Interface Reference framework:

Provides polymorphic creation of local and remote services: The Interface Reference framework provides consumers with a simple mechanism for creating and gaining access to services. Clients are insulated from the specific details required to create the service. Service consumers are only required to supply the "top" interface.

Can be extended to support other types of service stacks: The Interface Reference framework is extensible. For example, two types of services such as local and remote could be supported.

Can create a service on the fly from a description: Services are created automatically by the Interface Reference framework at the time a client requests the service. All of the information required to create the service is encapsulated by a Interface Reference entity.

Does not require a Service class hierarchy: Services used by the Interface Reference framework are not required to subclass from anything special. Any class can be used to provide a service for this framework (as long as the right helper classes are available).

Enumerates all possible services provided by an 10 port: The set of services that are currently supported by a particular port is available to clients on demand. For example, the services are used by the computer viewer for type negotiation whenever a device is connected by a user.

Client Dependencies

Hardware Configuration Framework/Computer Viewer: Must enable a TModelSurrogate to create a service which can access the physical hardware. A polymorphic interface reference is required to enable the same model class and constructor to be used by the computer viewer and the network browser. For example, an Image Writer can appear in both the computer viewer and the network browser. The same Image Writer model can be used by both the computer viewer and the network browser.

Requires the ability to know when a connection can be changed (a UI issue). It is preferable to prevent a user from changing a connection for a device which is currently in use.

Computer Viewer/Network Browser: Requires that the same TModelSurrogate class for a service to be used by both the computer viewer and the network browser.

Modem. Printer and MIDI Frameworks: Certain clients mustn't care if the service is local or remote and mustn't care what port the device is connected to. Certain objects and surrogates for particular devices may fall into this category of client. Examples include TModem, printer TModelSurrogate and MIDI TModelSurrogate.

Service Dependencies

Identification of a Service Description: Services are required to identify the interface they export to clients (i.e. their "top" interface) and the interface they require below them (i.e. their "bottom" interface), if they are expected to be used by the Interface Reference framework. Currently, this requirement only applies to the "helper" classes (to be described later) and not to the services themselves.

Hardware Configuration Framework: Information about local ports must be accessible in order to support creation of service stacks for local devices. This dependency implies that the computer database must be initialized with a valid root (i.e. motherboard) THardwareModuleHandle object. The THardwareInterfaceHandle on the peripheral providing the service gives us the following:

the ability to navigate the connection to discover to which port the peripheral is connected and access to the THardwareInterfaceIdentifier for the port.

Personality Neutral Services

The framework could be considered to be part of the personality neutral layer 706. The personality neutral layer 706 provides services to OS personalities (e.g. Taligent OS 704, OS/2 700, AIX 702). Once ported to the personality neutral layer, these OS personalities essentially become hardware platform 708 independent.

Architecture

While the following discussion provides numerous examples on particular elements of the processing hierarchy, it should be kept in mind that these are for purposes of illustration only. The concepts embodied herein regarding the dynamic creation of service stacks through references by clients can be applied to any elements in the processing hierarchy. The only relationship that is necessary is the need for a service by a client.

Survey

Class Diagram

Figure 9:
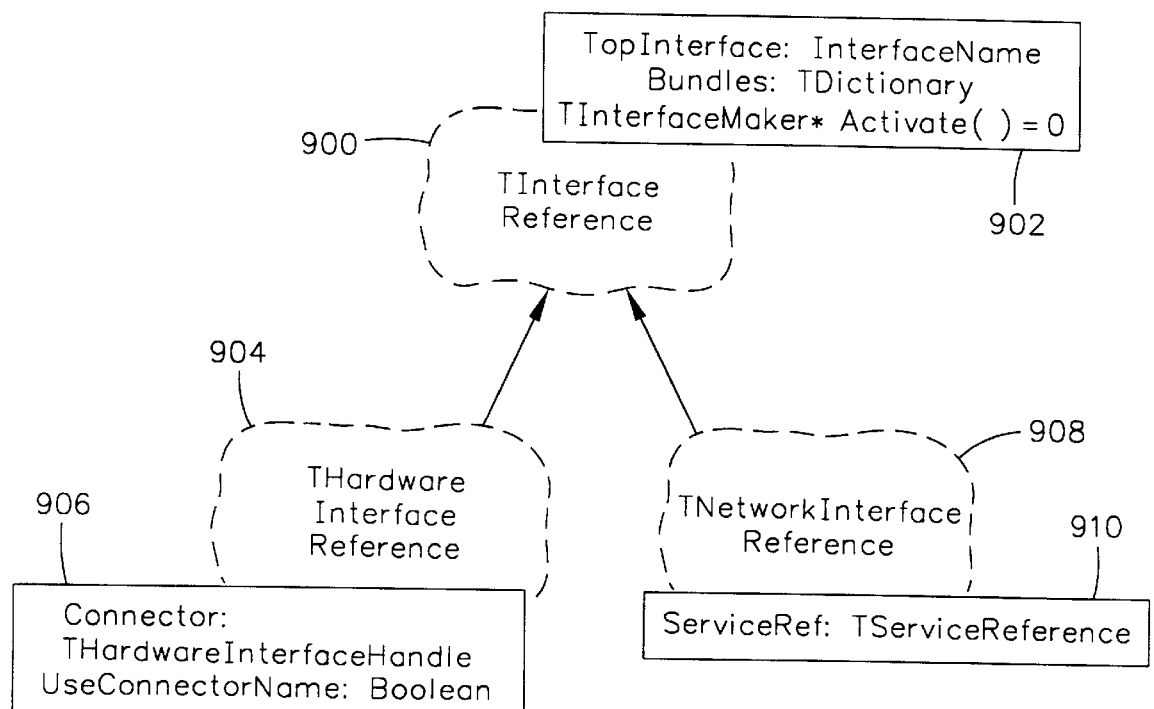
FIG. 9 illustrates the Interface Reference classes.
Figure 11:
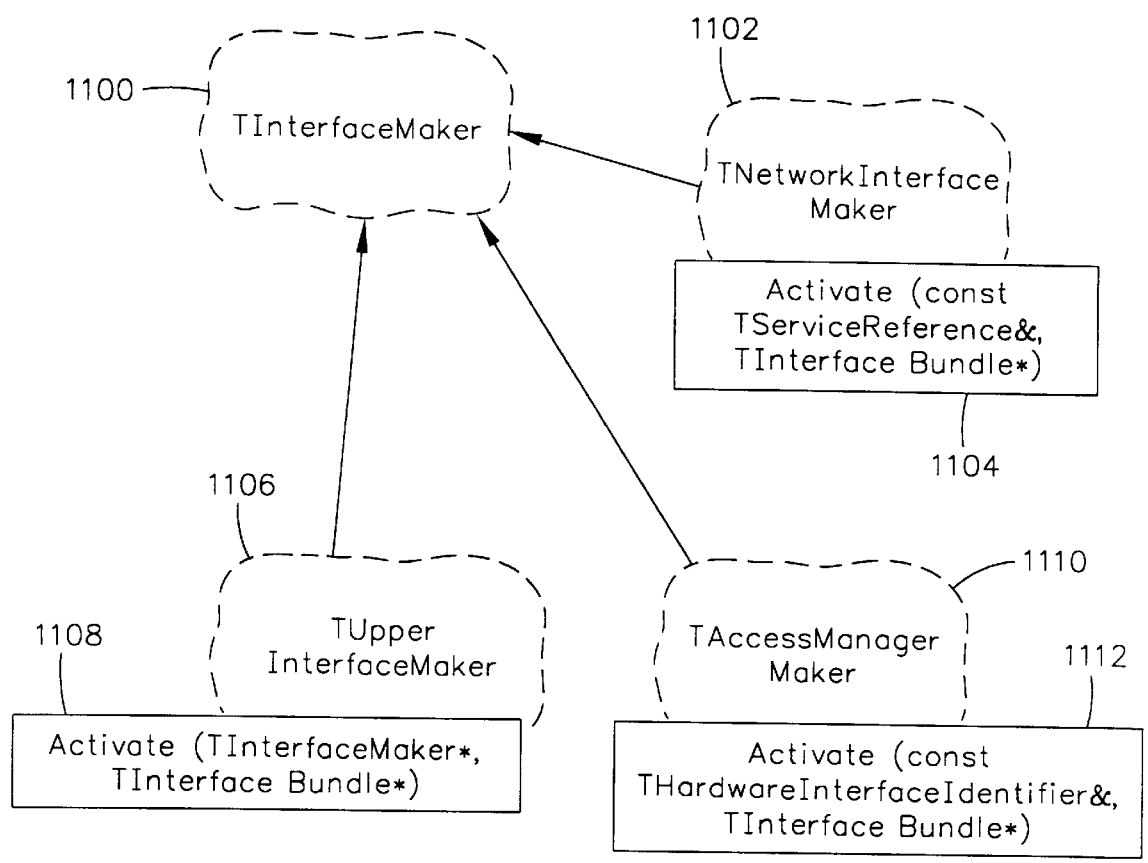
FIG. 11 illustrates the Interface Maker classes.
Figure 14:
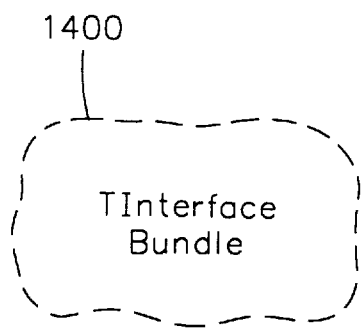
FIG. 14 illustrates the TInterfaceBundle classes.

The Interface Reference framework consists of three sets of classes:

(1) Interface Reference classes (FIG. 9), (2) Interface Maker classes (FIG. 11); and (3) TInterfaceBundle classes (FIG. 14).

Overview Diagram

Figure 8:
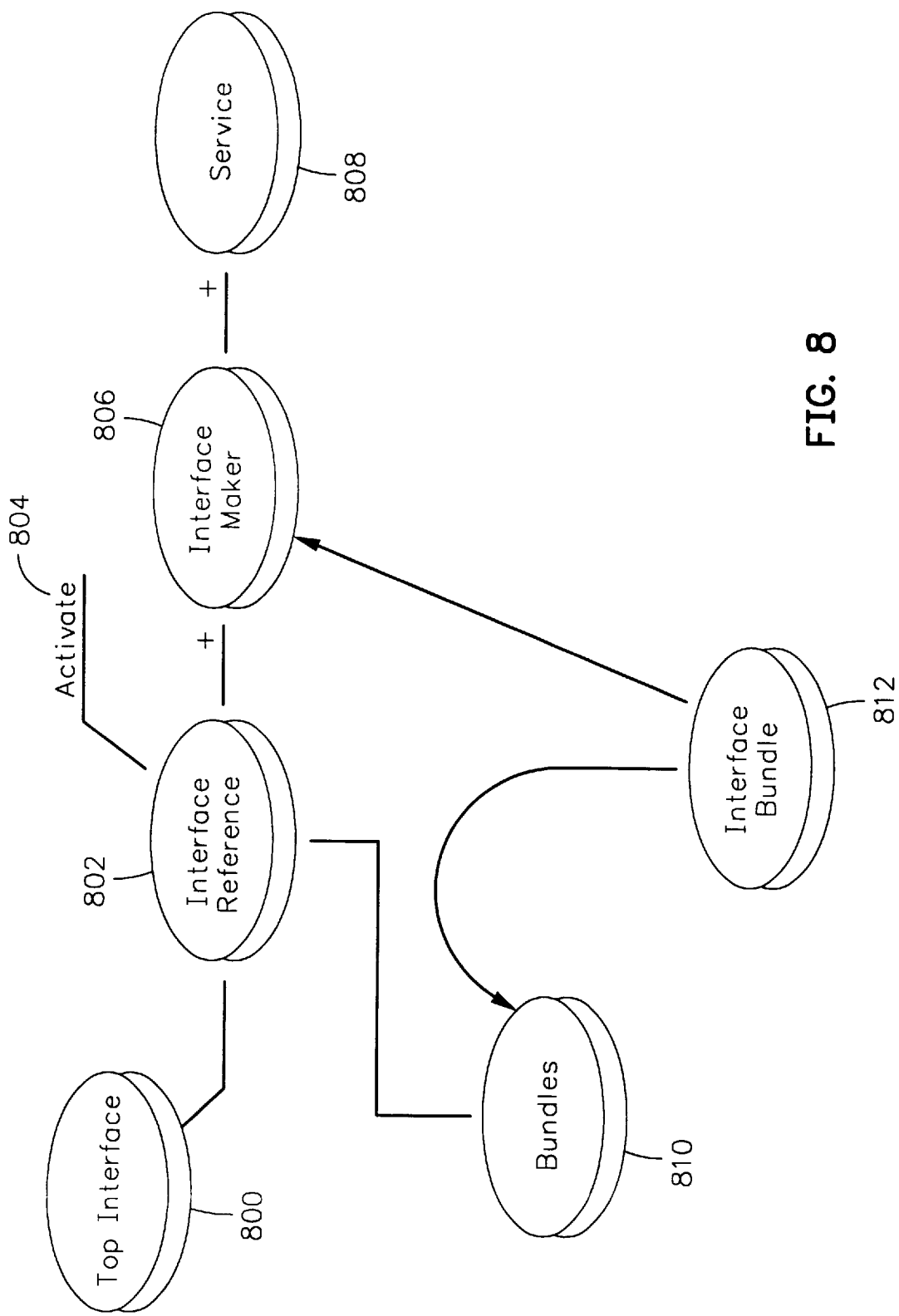
FIG. 8 is an overview of the operation of an interface reference.

FIG. 8 provides an overview of the relationships between all of the classes in the Interface Reference framework.

A client is given an interface reference object 802. The client sets the top interface attribute 800. The client calls Activate 804. The interface reference object creates an interface maker 806, passing it the bundle collection 810. The interface maker creates a service 808. It may optionally pass it the bundle collection, a specific bundle object, or call specific set methods to setup the service (whatever the service requires). The maker class insulates the interface reference framework from the details of setting up the service.

Interface Reference Components

Interface Reference Classes (FIG. 9):

Developed by Taligent. May be subclassed for special needs.

Used by service consumers to create a service.

TInterfaceReference 900

The primary purpose of TInterfaceReference 900, and its associated attributes 902, is to enable clients to create services without concern for how the service is provided. For example, using the Interface Reference framework, a universal TImageWriterModel class can be written. The class is independent of whether the ImageWriter is located on the network or connected locally to the host computer. An instance of a subclass of TInterfaceReference represents the ability to create and access a service for a specific device, with a specific API.

A service stack can be represented by one or more services nested one on top of the other. From one session to the next, the same TInterfaceReference may create a different service stack depending upon whether the connection has changed or whether new software has been installed.

TInterfaceReference 900 has the following attributes 902:

TopInterface: InterfaceName—This value specifies the type of service interface the client requires.

Bundles: TDictionary<InterfaceName, TInterfaceBundle>—Each key in the dictionary is an InterfaceName object and is associated with one instance of a subclass of TInterfaceBundle. The TInterfaceBundle object encapsulates data specific to the type of interface it represents. For example, a serial interface could encapsulate BAUD rate and Parity information. Bundles are optional. When a service is activated, a bundle (when present) is passed into the service maker.

The following scenario illustrates how a universal ImageWriter model, which will work for local and remote devices, is supported. The ImageWriter model knows only that it has a TInterfaceReference; it doesn't care which type. The service can be remote, local serial or local parallel. These details are unimportant from the point of view of the model. All the ImageWriter model requires is a service exporting an interface of "PrinterDeviceChannel".

The ImageWriter model code, to obtain the printer service, might look like this:

```
TPrinterDeviceChannelMaker*    theDeviceChannelMakerPtr;
TPrinterDeviceChannel*         theDeviceChannelPtr;
TInterfaceReference*           theReferencePtr;
theReferencePtr = this->GetInterfaceReference();
theReferencePtr->SetTopInterface(kPrinterDeviceChannel);
theDeviceChannelMakerPtr = (TPrinterDeviceChannelMaker*)
    theReferencePtr->Activate();
theDeviceChannelPtr = theDeviceChannelMakerPtr->
    GetDeviceChannel();
```

TNetworkInterfaceReference 908

The purpose of TNetworkInterfaceReference 908 is to shield clients from the details of how a service for a remote device is created. An active TNetworkInterfaceReference object represents access to a remote service.

TNetworkInterfaceReference 908 has the following attributes 910:

Service Reference: TServiceReference 910—This value specifies the network service reference to use when the TNetworkInterfaceReference object is activated. When a TNetworkInterfaceReference 908 object is activated, it uses the "top" interface and the TServiceReference attribute 910 to create the service stack.

Figure 10:
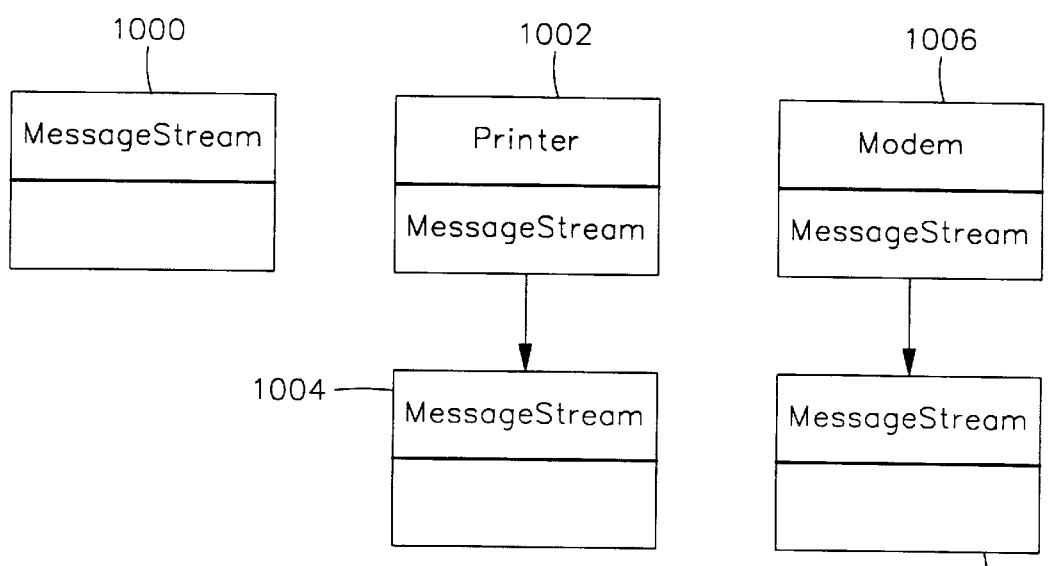
FIG. 10 is a block diagram showing possible service stack configurations.

The bottom service of this service stack is a TRequestSenderStream object. FIG. 10 illustrates possible variations of the service stacks. If the top interface is "TRequestSenderStream", then the stack consists of just this single service, as shown by 1000. If the "top" interface is "printer", then the set of services, with "printer" on top and "TRequestSenderStream" on bottom, is created. This is demonstrated by FIG. 10, at items 1002 and 1004. If the "top" interface is "modem", then the set of services, with "modem" on top and "TRequestSenderStream" on bottom, is created. This is demonstrated by FIG. 10, at items 1006 and 1008.

THardwareInterfaceReference 904

The purpose of THardwareInterfaceReference 904 is to shield clients from the details of how a service for a local device is created. An active THardwareInterfaceReference object 904 represents access to a service provided by a real local device.

THardwareInterfaceReference has the following attributes 906:

Connector: THardwareInterfaceHandle—THardwareInterfaceHandle represents a connector on the device actually performing the service the interface reference represents. THardwareInterfaceReference 906 can determine the absolute "bottom" interface required to construct the service stack by following this connector's hardware connection.

UseConnectorName: Boolean—If TRUE, then when the interface reference object is activated, it will ignore the given "top" interface name and instead, use the InterfaceName in the connector as the "top" interface name.

This is useful for clients who know what abstract protocol they must use, but don't want to specify a concrete protocol. For example, a client may use a pointing device protocol, but may not want to get involved with the decision of whether to use "LogiTechPointingDevice" protocol or "AppleADBMouse" protocol. This decision is made automatically by the THardwareInterfaceReference object 904 if the UseConnectorName value is set to TRUE.

As shown and discussed above with respect to FIGS. 4 and 5, when a THardwareInterfaceReference object is activated, it uses the "top" interface and the "bottom" interface, determined from the THardwareInterfaceHandle attribute, to create the service stack.

TInterfaceMaker

Interface Maker Classes (FIG. 11):

Developed by access manager writers, service class providers or anybody.

Used internally by the Interface Reference classes to create a service.

The purpose of TInterfaceMaker 1100 is to insulate all of the service provider classes from the service stack framework and to provide a limited amount of typesafety (e.g. no void*). Each maker object represents the ability to create and initialize a particular service. The interface reference framework deals directly with interface maker objects, NOT services. For example, to create a service, an interface reference calls the Activate method (1104, 1108, 1112) on the maker object (1102, 1106, 1110), which creates and initializes the service. The interface reference object never directly touches the service. Never.

The reason for this extra level of indirection is so we don't require every service in the system to derive from a single class defined by the Interface Reference framework. For example, a TSerialACIA6850 access manager class is not required to derive from any class in the Interface Reference framework.

Figure 12:
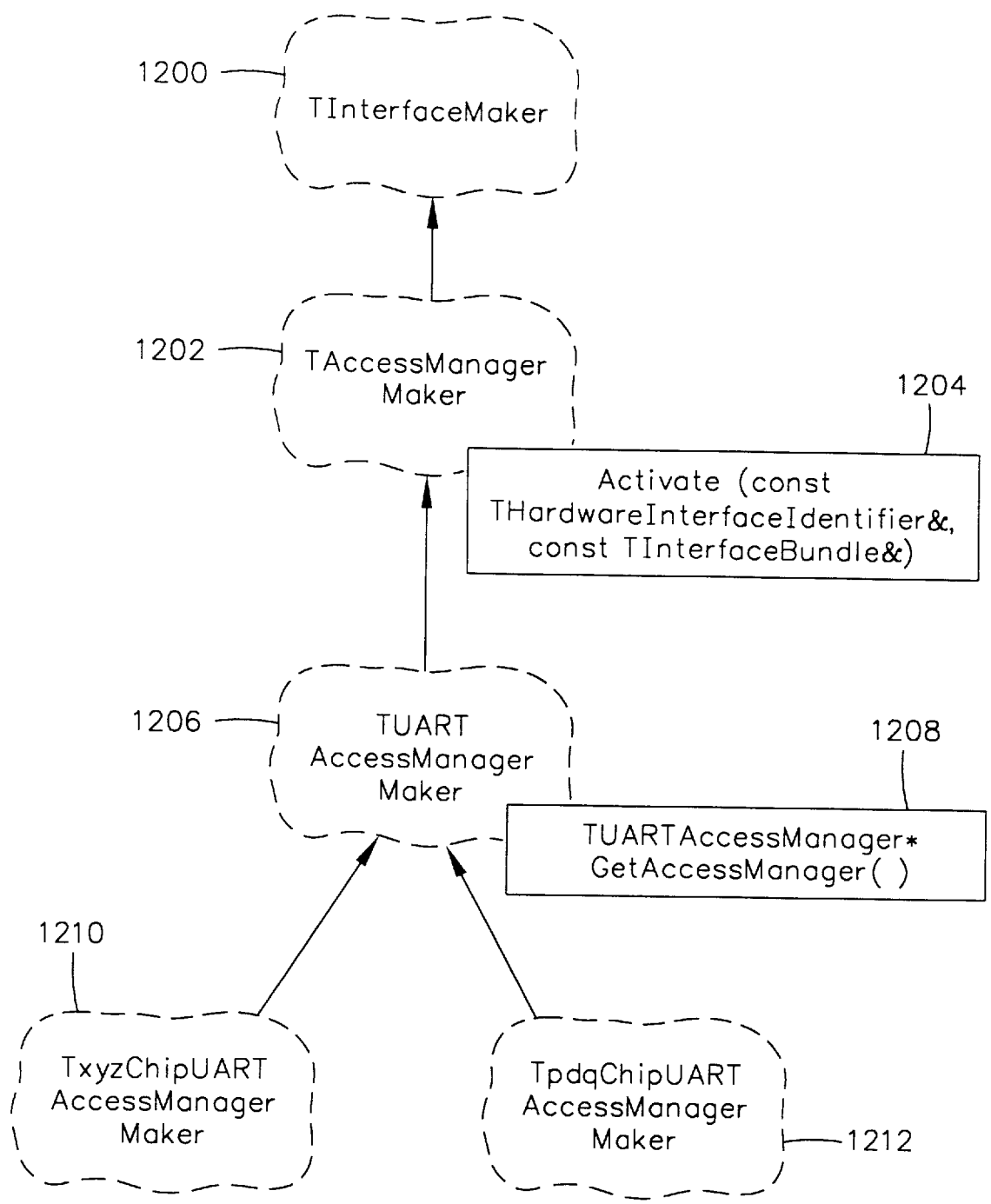
FIG. 12 demonstrates the hierarchical restrictions among service makers.
Figure 13:
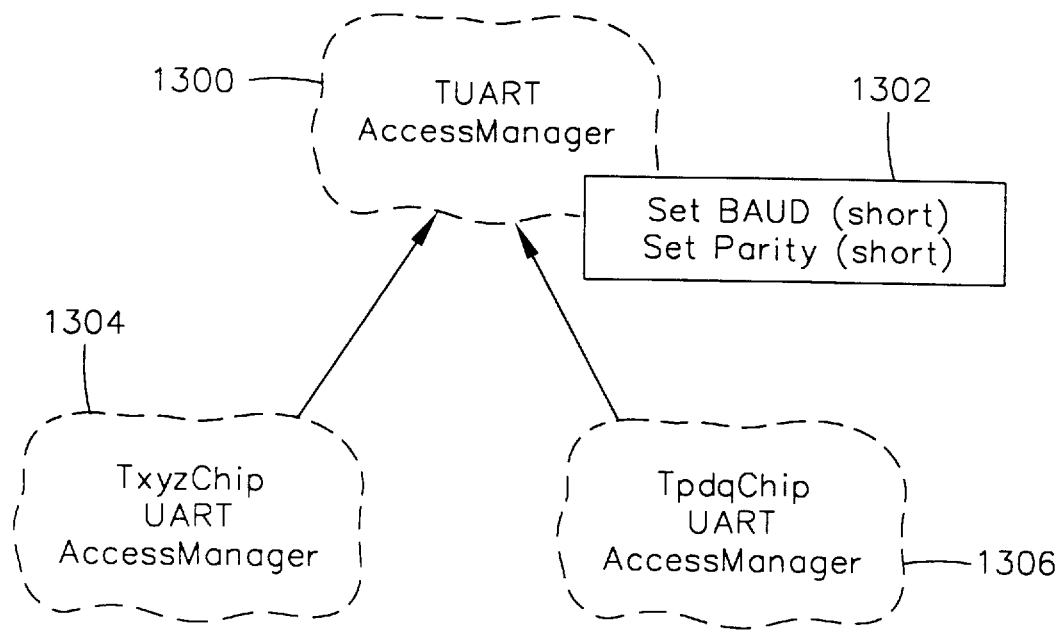
FIG. 13 illustrates the freedom of the hierarchy of services.

Service makers have very little overhead and are simple to develop. Service makers belong to a hierarchy dictated by the interface reference framework. FIGS. 12 and 13 contrast the hierarchy restrictions of service makers to the hierarchy freedoms of services. Notice that makers have TInterfaceMaker 1200 as a parent. Services on the other hand are free to belong to whatever hierarchy their authors desire.

An active subclass of a TInterfaceMaker object 1200 may be down-cast into the appropriate sub-type to safely obtain a pointer to the real service object. It provides no protocol. In the example of FIG. 12, a client would down-cast his TInterfaceMaker 1200 pointer to TUARTAccessManagerMaker 1206 and then safely call GetAccessManager 1208, which returns a pointer to a TUARTAccessManager 1300. The following more concisely defines the relationships between TUARTAcessManagerMaker 1206 and TUARTAcessManager 1300:

```
TUARTAccessManagerMaker*    theUARTAccessManager
    MakerPtr;
TUARTAccessManager*         theUARTAccessManagerPtr;
theUARTAccessManagerMakerPtr =
    (TUARTAccess ManagerMaker*)anInterfaceReferencePtr->
    Activate();
theUARTAccessManagerPtr = theUARTAccessManagerMakerPtr->
    GetAccessManager()
```

TAccessManagerMaker 1202

A TAccessManagerMaker object 1202 creates and activates an access manager. The access manager arbitrates access to the device identified by the THardwareInterfaceIdentifier object passed in to the Activate method. The access manager is not required to derive from an Interface Reference base class. This subclass of TInterfaceMaker 1200 is used to create the bottom service of a service stack. TAccessManagerMaker objects 1202 are created by TInterfaceReference objects when the TInterfaceReference object is activated. The TInterfaceReference passes in the THardwareInterfaceIdentifier object which represents the "metal" the Access Manager controls.

TUpperInterfaceMaker

A TUpperInterfaceMaker object allows TInterfaceMaker to create and activate a specific service object on top of some other service. This subclass of TInterfaceReference is used to create and activate a specific service object on top of some other service. This subclass of TInterfaceMaker is used to create non-bottom services of a service stack. The service is not required to derive from an Interface Reference base class. TUpperInterfaceMaker objects are created by TInterfaceReference objects when the TInterfaceReference object is activated.

TInterfaceBundle 1400
Interface Bundle Class (FIG. 14):

Developed by access manager writers or service class providers

Used directly by services to provide configuration information.

An instance of a TInterfaceBundle 1400 represents encapsulated information specific to a particular service. A bundle can be passed into service makers polymorphically at activation time. TInterfaceBundle 1400 is subclassed to encapsulate the information specific to a particular type of service.

An instance of a TInterfaceBundle 1400 can be streamed to a file.

Key Scenarios

Activate a THardwareInterfaceReference—Overview #1

This scenario is presented twice; once using Booch notation and once using VDL (Visual Design Language) notation. This was done because neither notation does an excellent job of conveying the process of service stack activation.

Scenario: A client has a TInterfaceReference pointer to an object whose actual subclass is THardwareInterfaceReference and whose top interface is set to "Printer". The client calls its Activated method. Activation occurs in two stages: (I) Creation of a stack description and (II) creation of the service stack.

Figure 15:
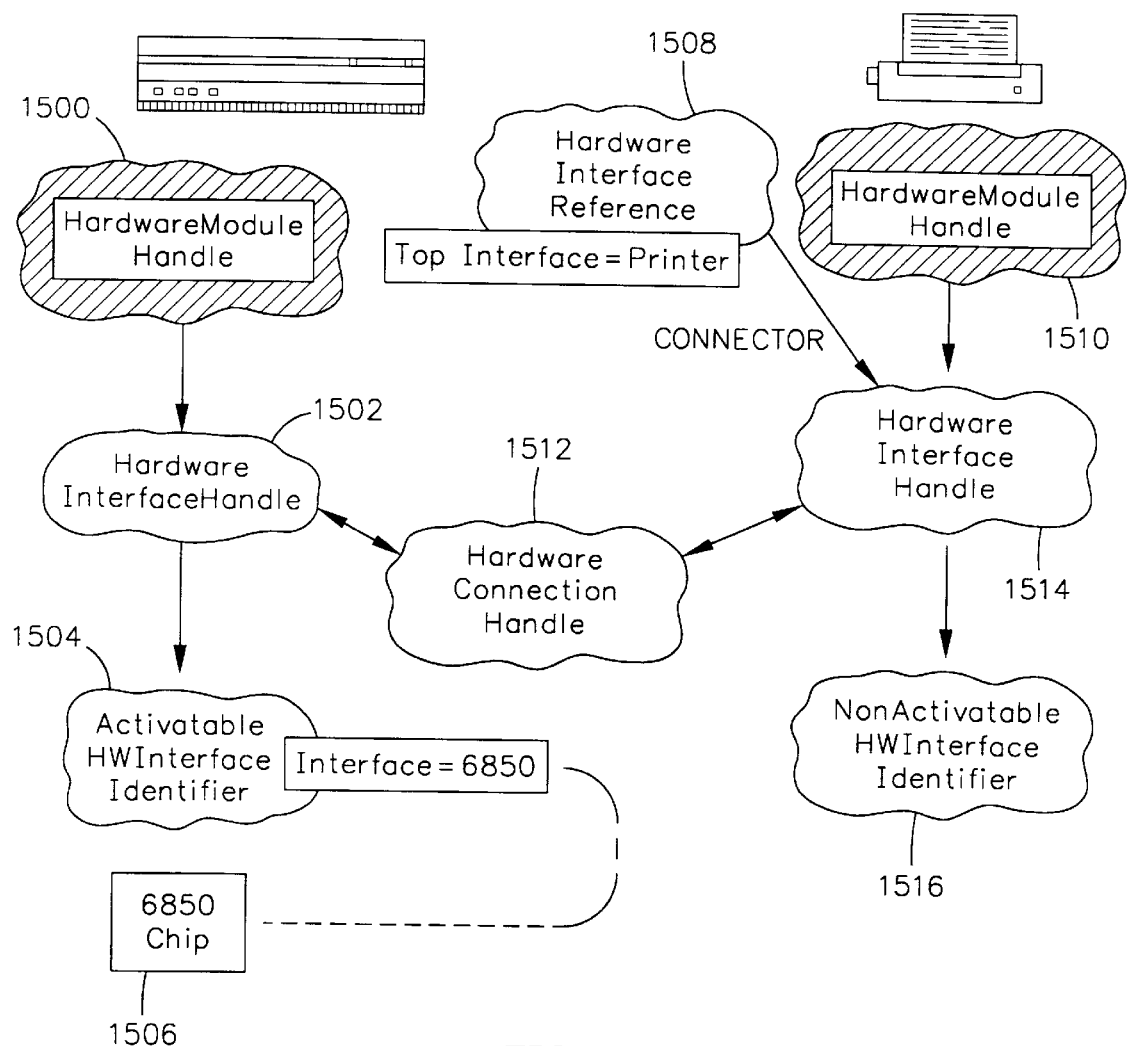
FIG. 15 illustrates the hardware configuration for THardwareInterfaceReference.

FIG. 15 illustrates the hardware configuration for this scenario. Handles 1500 and 1510 are objects used to reference the hardware components. The THardwareInterfaceReference object 1508, the printer's connector 1514 (an attribute of the THardwareInterfaceReference object), the connector's identifier object 1516, the connection object 1512, the connector the printer is connected to 1502, the connector's identifier object 1504 and the "metal" 1506.

(I) Creation of the stack description (1) The first step the THardwareReference object must perform in order to create the stack description is to get the "bottom" interface. The bottom interface, in this scenario, is found as follows. First, access the THardwareInterfaceReference object's connector attribute 1514. Next, retrieve the THardwareInterfaceIdentifier object 1516 from it and test it. The identifier can not be activated, so we continue. Next, the THardwareInterfaceReference object retrieves the connection object 1512 from the printer's connector. The other end 1502 is retrieved from the connection. The THardwareInterfaceIdentifier object 1504 is retrieved from it and tested. This identifier object is activatable, so we can stop. It specifies the bottom interface "6850".

(2) At this stage, we know the very Top ("Printer") and the very Bottom ("6850") interface of our service stack. The next step involves searching through the file system (and potentially NuBus ROM) looking for the set of services which can be joined to form the required service stack (this can be conveniently implemented by subclassing TLocator or TFSLocator).

Figure 16:
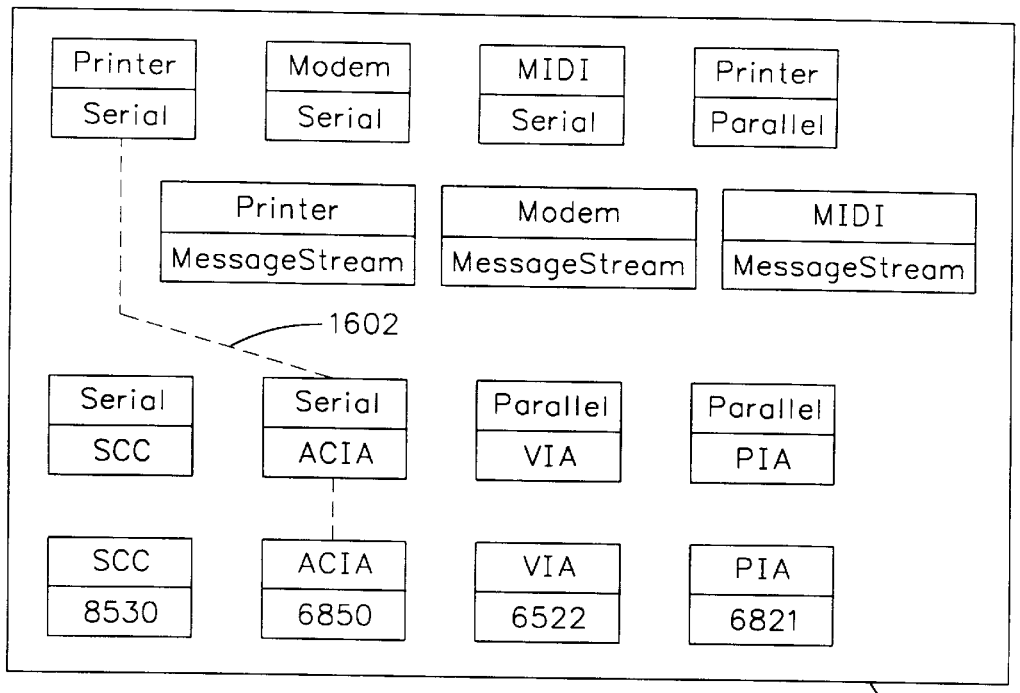
FIG. 16 illustrates a hypothetical "pool" of service maker entities (i.e. these are the entities which would be found from a TServiceMakerLocator property search)

FIG. 16 illustrates a hypothetical "pool" 1600 of service maker entities (i.e. these are the entities which would be found from a TServiceMakerLocator property search). Each entity in the pool represents one TServiceMaker entity which is "installed" on the system. Each entity is identified by its top and bottom interface. The dashed lines 1602 indicate the path we would find for our THardwareInterfaceReference object.

(3) The calculated stack "description" for our THardwareInterfaceReference object is defined by the entities connected by the dotted line in FIG. 16.

Figure 17:
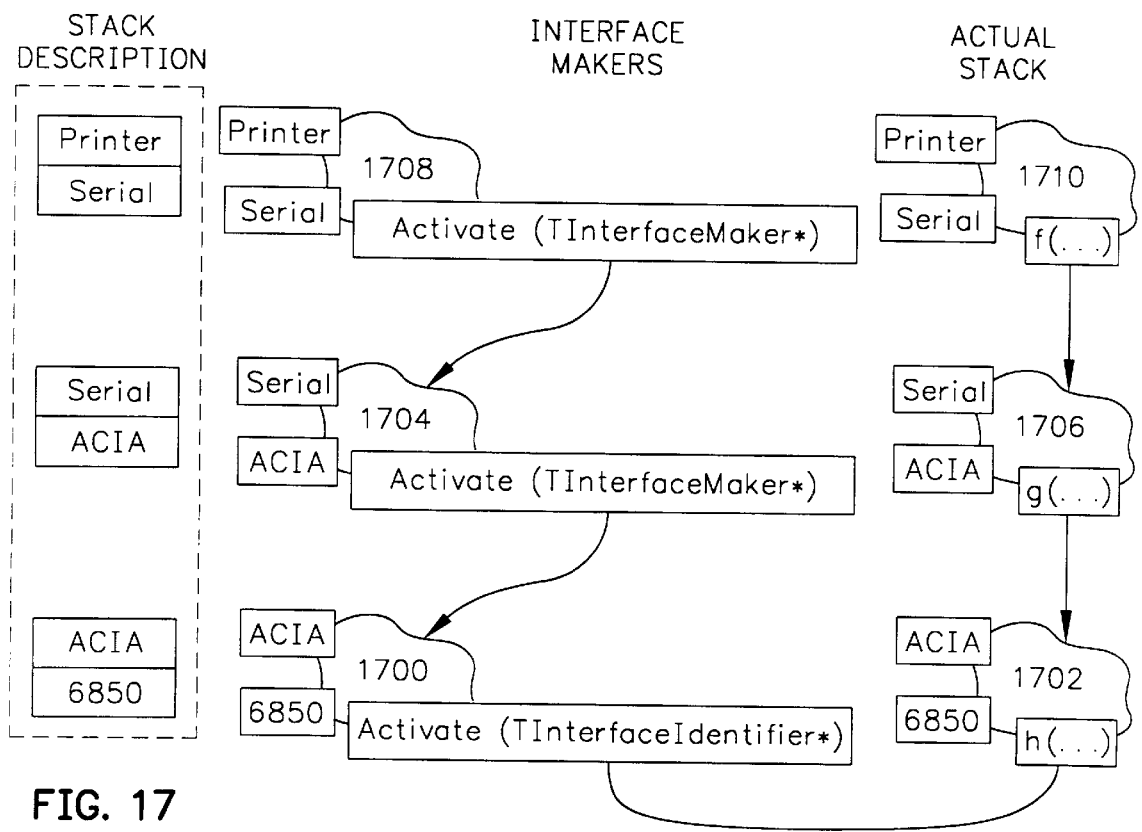
FIG. 17 demonstrates stack creation by THardwareReference object.
Figure 18:
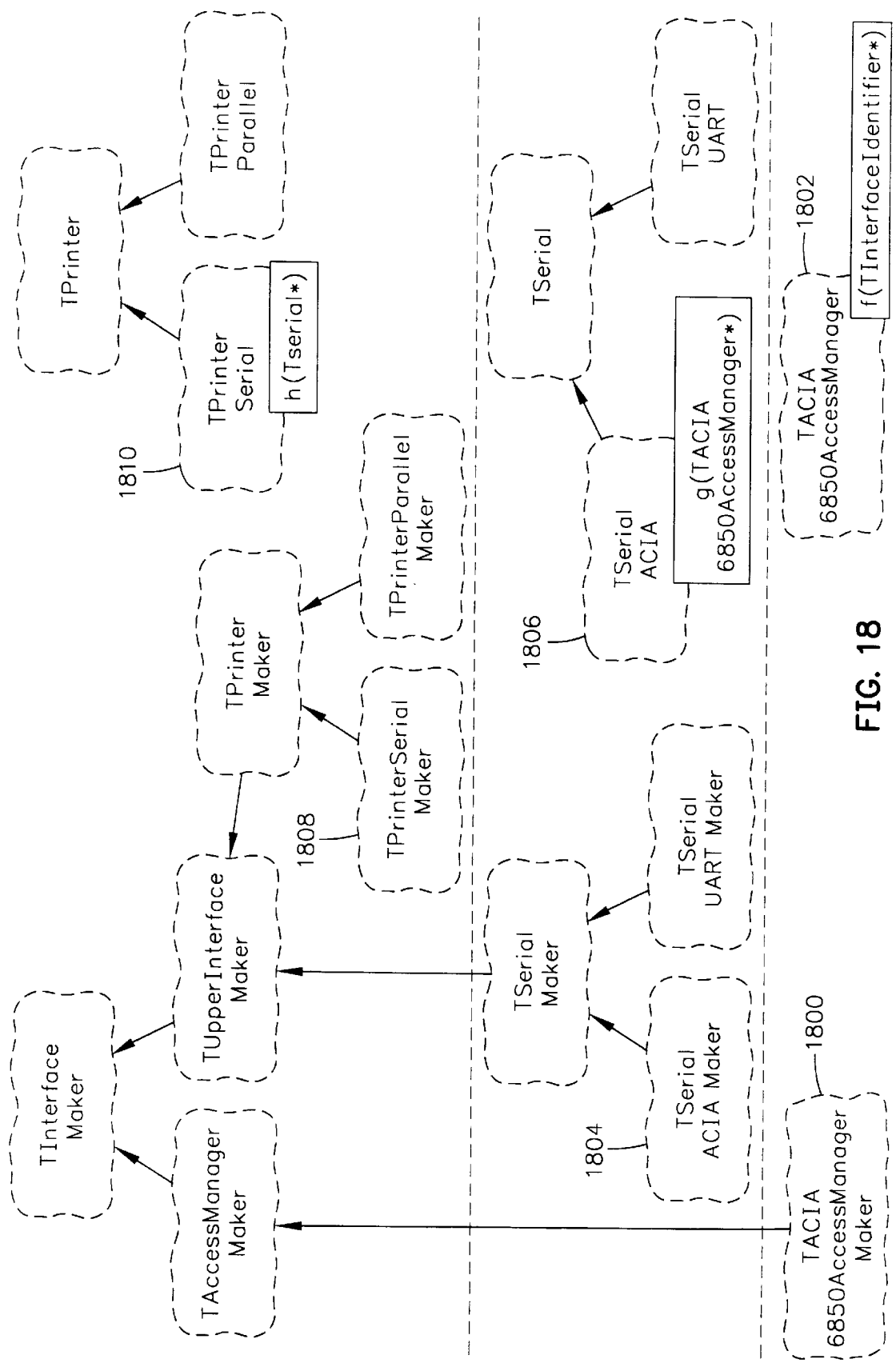
FIG. 18 shows various class relationships of some of the elements of FIG. 17.

(II) Creation of the stack (1) The THardwareReference object creates the stack in the following order, as shown in FIG. 17:

(a) Create the bottom most TInterfaceMaker object in the stack description. The created object 1700 is an instance of the class 1800 shown in FIG. 18. It is activated by passing in the TInterfaceIdentifier retrieved from the THardwareInterface object representing this ACIA port. FIG. 18 illustrates numerous classes, but only particular classes related to FIG. 17 will be discussed. Many of the relationships shown in FIG. 18 have been discussed previously.

(b) The TInterfaceMaker object creates its corresponding service (an access manager) and calls ho, passing in the same TInterfaceIdentifier. This new service is labeled 1702 in and is an instance of class 1802 in FIG. 18.

(c) The THardwareReference object continues by getting the next TInterfaceMaker object from the stack description (this is a TUpperInterfaceMaker). It Activates the TUpperInterfaceMaker, passing in the TAccessManagerMaker object 1700. Next comes the tricky part. Knowing full well that the TAccessManagerMaker object passed into it is an ACIA Maker (that's what we promise and it works if the properties don't lie), it down casts it to the proper type of maker and asks it for the service 1702. The result of this operation is access to the ACIA Access Manager.

(d) Next, the TUpperInterfaceMaker object creates its corresponding service (which can be derived from anything), and calls go, passing it the ACIA Access Manager.

(e) The THardwareReference object continues by getting the next TInterfaceMaker object from the stack description (another TUpperInterfaceMaker). It Activates it, passing in the TAccessManagerMaker object 1704, of class 1804. The down cast magic happens again and asks the TUpperInterfaceMaker object passed in for the service 1706, of class 1806. The result is the Serial-ACIA service.

(f) Finally, the TUpperInterfaceMaker object creates its corresponding service 1710, of class 1810 calls for passing it the Serial-ACIA service.

Now the service stack is complete. The THardwareReference object returns as the result of activate, the top most TInterfaceMaker 1708, of class 1808. Clients may then do the down cast thing to the result and gain access to the top-most service in the stack.

Activate a THardwareInterfaceReference—Overview #2

Scenario: A client has a TInterfaceReference pointer to an object whose actual subclass is THardwareInterfaceReference. The client calls its Activated method which executes in two stages: (I) creation of the stack description and (H) creation of the stack.

Figure 19:
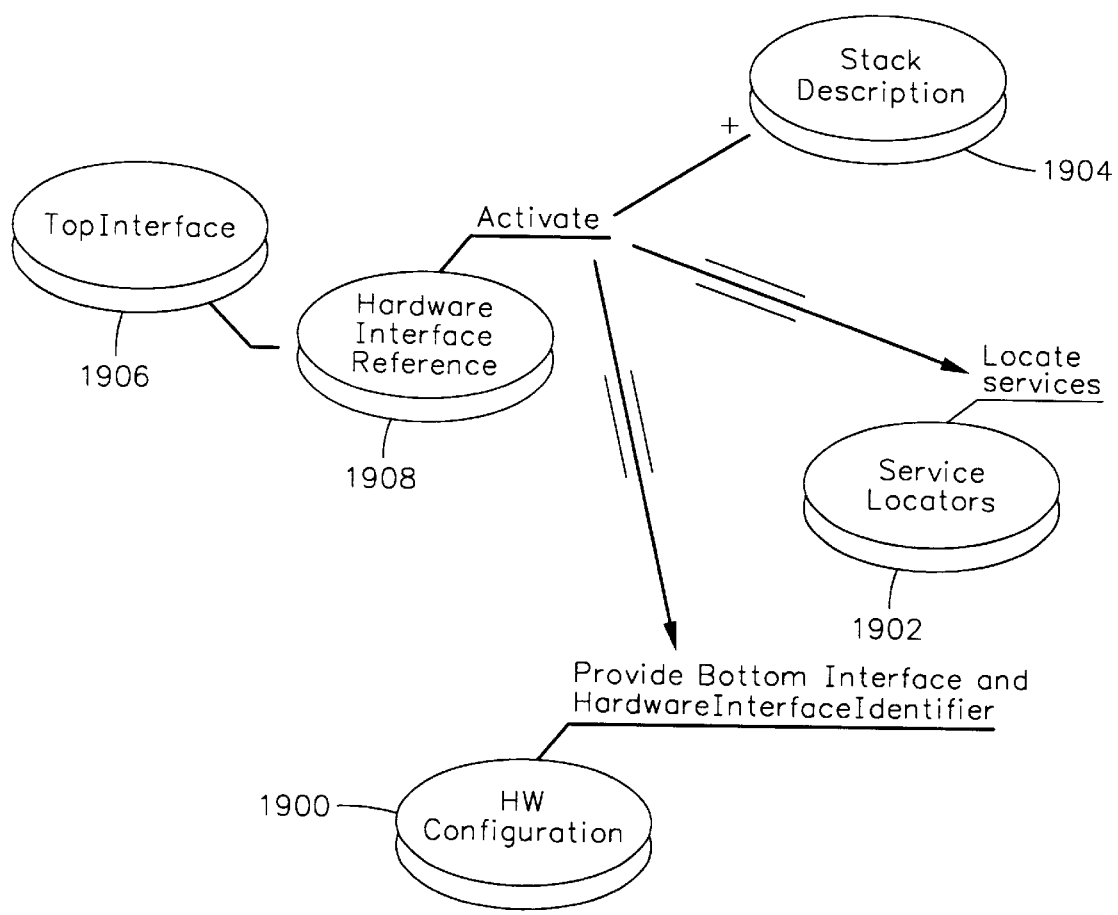
FIG. 19 illustrates the creation of the stack description for THardwareInterfaceReference activation.

(I) Creation of the stack description (FIG. 19)

The creation of the stack description for a THardwareInterfaceReference object 1908 for a Top Interface 1906 involves the following steps: First, we get the "bottom" interface from the hardware configuration framework 1900. Next, we locate the set of services 1902 which satisfy the required interfaces. Finally, we calculate the stack description 1904. This is accomplished by matching the top interface of one service with the bottom interface of another service, until we find the set of services which can be stacked one on top of the other to form a stack with the proper top and bottom interfaces. There is an assumption that there will only be one service stack description calculated from this process. If more than one stack description is found, then perhaps an exception could be generated.

Note: The service stack itself is not actually created in this process, just a description of the stack. The stack description consists of an ordered list of references to interface makers. Each interface maker knows how to make its corresponding service and is called on to do so in the next stage of our scenario.

(II) Creation of the stack:

The creation of the service stack is shown twice. This first section presents a brief overview. The second section presents a more detailed version.

Overview

Figure 20:
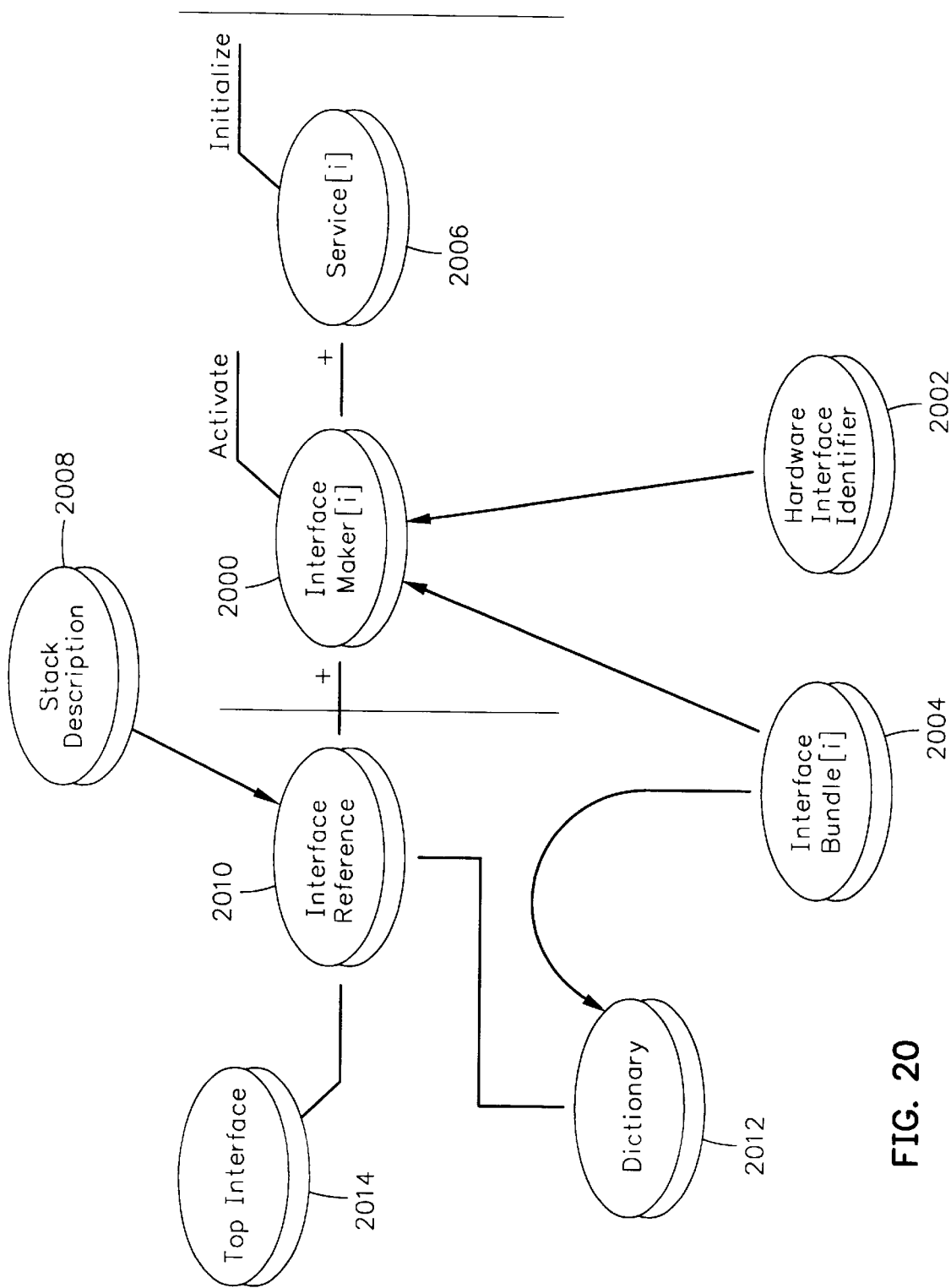
FIG. 20 illustrates the overall operation of stack creation for THardwareInterfaceReference.

FIG. 20 illustrates the overall operation of stack creation for THardwareInterfaceReference. The creation of the service stack involves iterating across the stack description 2008. For each interface maker "reference" 2010 in the stack description, we do the following. First, create an interface maker object 2000. Next, activate the interface maker object, passing in the appropriate arguments (if it's an Access Manager Maker, pass in a THardwareInterfaceIdentifier 2002; if it's an Upper Interface Maker, pass in a pointer to the TInterfaceMaker object below it). If available, the corresponding TInterfaceBundle object 2004 is given to the interface maker object 2000. Finally, the interface maker object 2000 creates its corresponding service object 2006. The interface maker object 2000 initializes the service object 2006. It is intimately aware of what information is required (e.g. THardwareInterfaceIdentifier, pointer to the TInterfaceMaker object below it, TInterfaceBundle object, etc.).

Details

This section presents a detailed VDL scenario of how a service stack is created.

Figure 21:
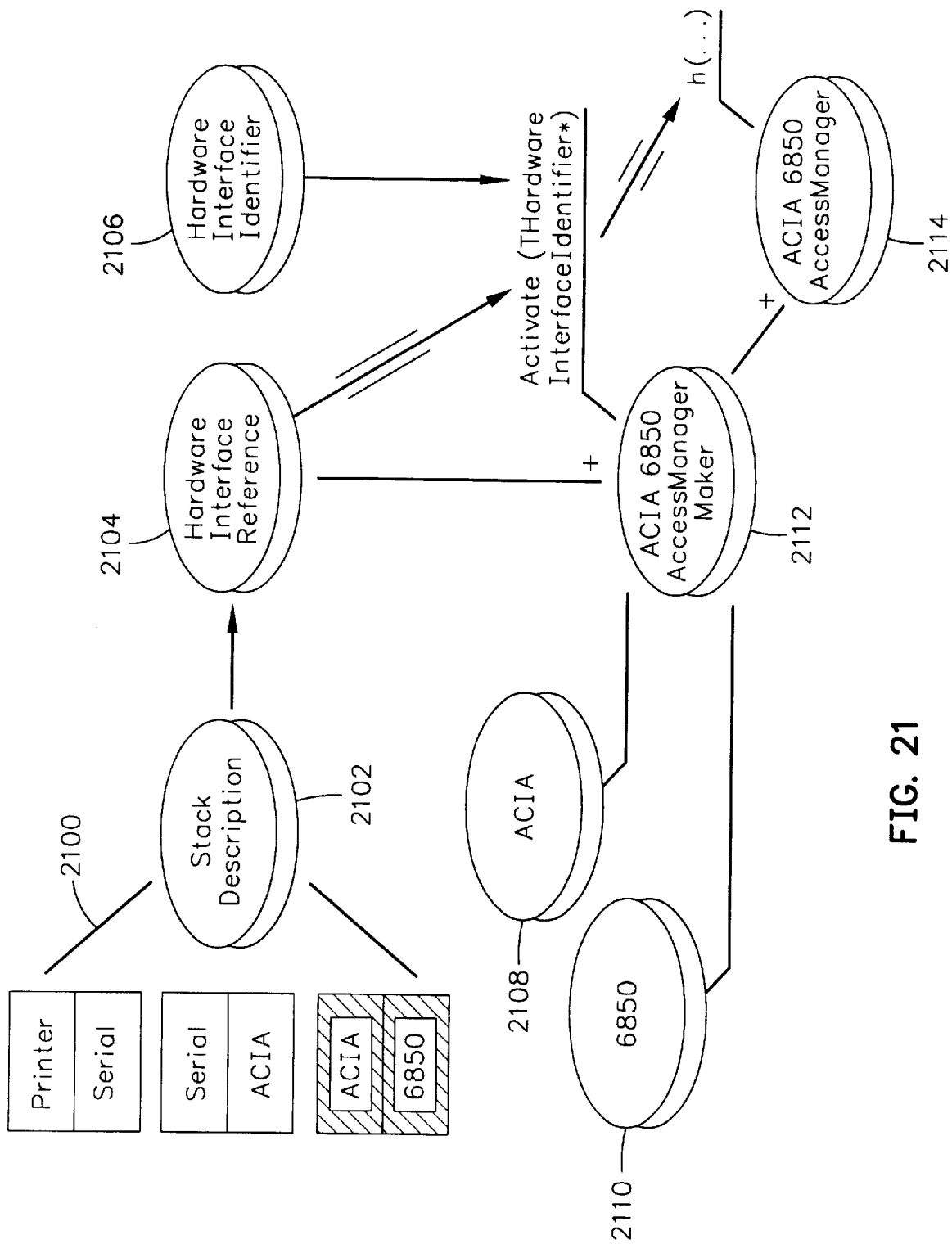
FIG. 21, FIG. 22, and FIG. 23 collectively illustrate, by visual design language, service stack creation by THardwareInterfaceReference.

As shown in FIG. 21, the THardwareInterfaceReference object 2104 creates the stack in the following order:

(1) Create the bottom-most TInterfaceMaker object 2112 in the stack description 2102 (the created object is an instance of the class shown in FIG. 20 with a 2000 beside it). The stack description is based on the collection of services represented by 2100. The TInterfaceMaker object 2112 is activated by passing in the THardwareInterfaceIdentifier 2106 retrieved from the THardwareInterfaceHandle object representing the ACIA port. Elements 2108 and 2110 provide representations of ACIA and 6850, respectively.

(2) The TInterfaceMaker object 2112 creates its corresponding service (an access manager 2114) and calls its initializing function, ho, passing in the same THardwareInterfaceIdentifier 2106. This new service is labeled 2114 in FIG. 21 and is an instance of class 2002 in FIG. 20.

Figure 22:
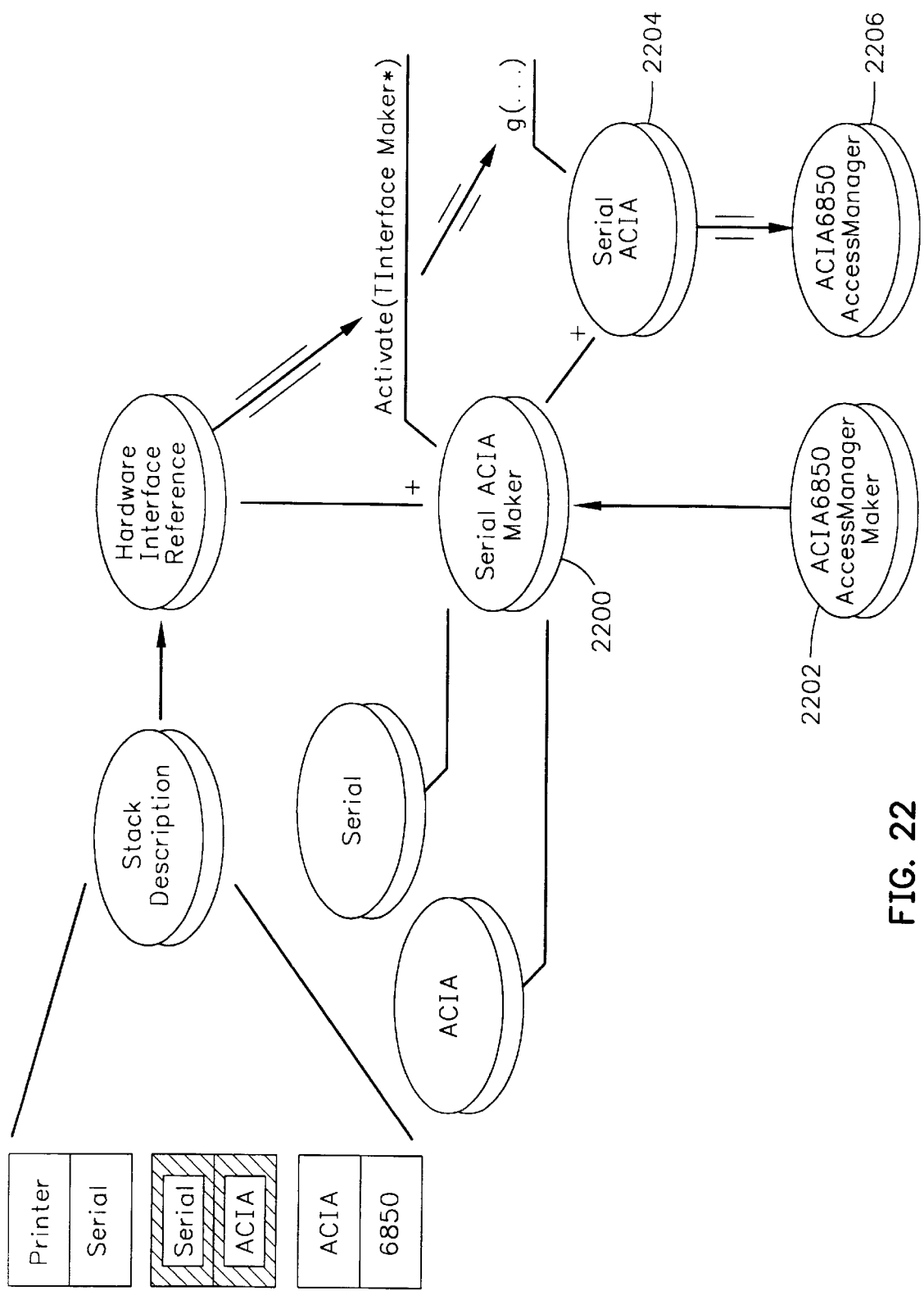

(3) As shown in FIG. 22, the THardwareinterfaceReference object continues by creating the next TInterfaceMaker object 2200 from the stack description (this is a TUpperInterfaceMaker). It Activates the TUpperInterfaceMaker, passing in the TAccessManagerMaker object it created in step 1. Next comes the tricky part. Knowing full well that the TAccessManagerMaker object 2202 passed into it is an ACIA Maker 2200, it down-casts it to the proper type of maker and asks it for the service 2206 created in step 2. The result of this operation is access to the ACIA Access Manager. Many of the elements of FIG. 22 are identical in nature to corresponding elements of FIG. 21, and need no further explanation.

(4) Next, the TUpperInterfaceMaker object creates its corresponding service 2204 (which can be derived from anything), and calls its initializing function, go, passing it the ACIA Access Manager.

Figure 23:
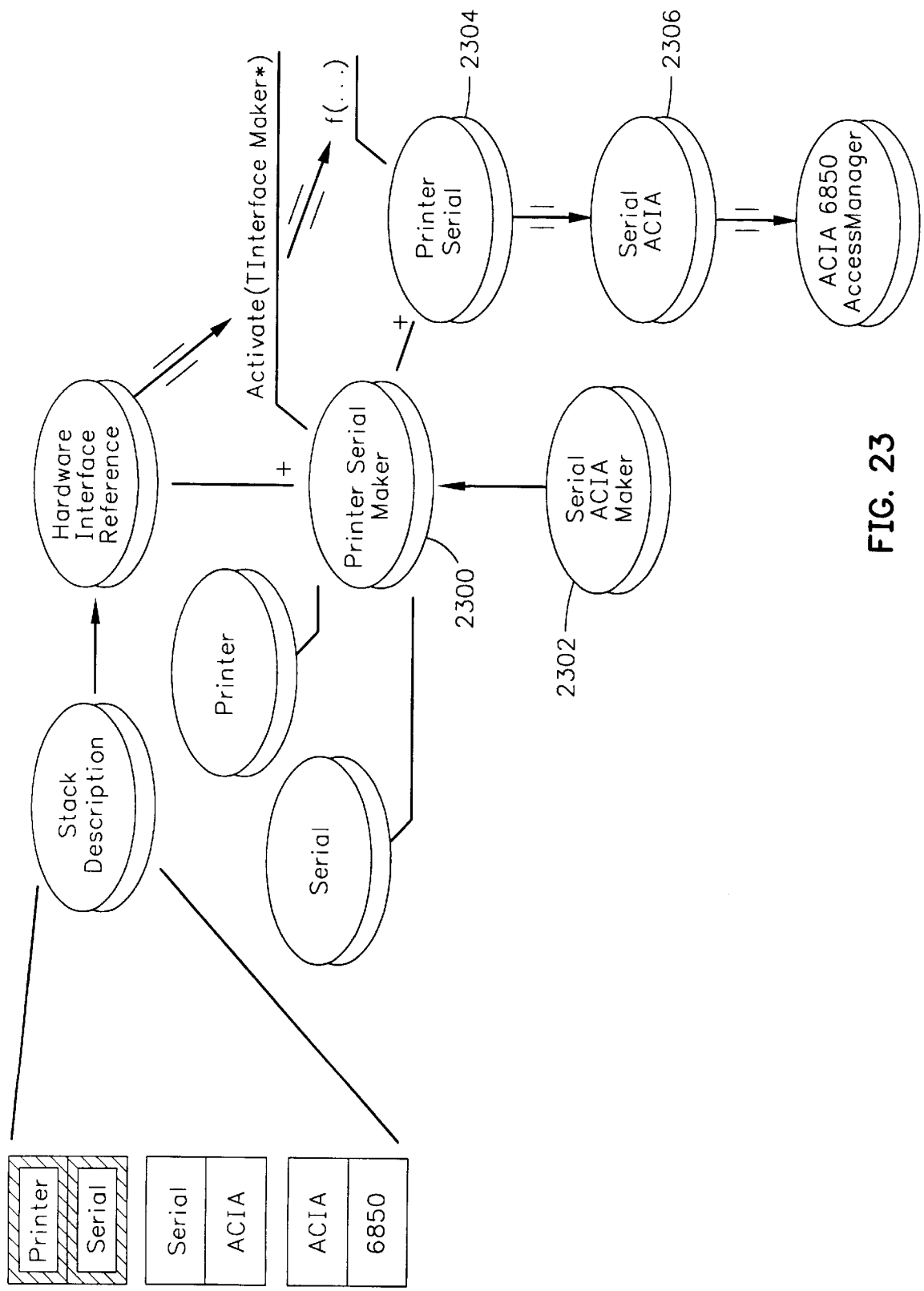

(5) As shown in FIG. 23, the THardwareInterfaceReference object continues by creating the next TInterfaceMaker object 2300 from the stack description (another TUpperInterfaceMaker). It Activates it, passing in the TAccessManagerMaker object 2302. The down-cast magic happens again (result is the Serial-ACIA service 2306).

(6) Finally, the TUpperInterfaceMaker object creates its corresponding service 2304, calls its initializing function, f( ), passing it the Serial-ACIA service.

Now the service stack is complete. There are no more entries in the stack description. The THardwareInterfaceReference object returns the top-most TInterfaceMaker created in step 5. Clients then down-cast it and gain access to the top-most service in the stack.

Create Stack Description—Serial Port (Mouse)

Scenario: The Interface Reference framework works when the client isn't real sure about which "top" interface to use. This scenario is slightly different from the previous scenarios because this time the UseConnectorName Class attribute is set to TRUE. This causes the interface reference to use the connector's interface name as the top interface. This is very much like the operations associated with FIG. 15.

A client has a TInterfaceReference pointer to an object whose actual subclass is THardwareInterfaceReference and whose top interface is "PointingDevice". The client calls its Activate( ) method.

Figure 24:
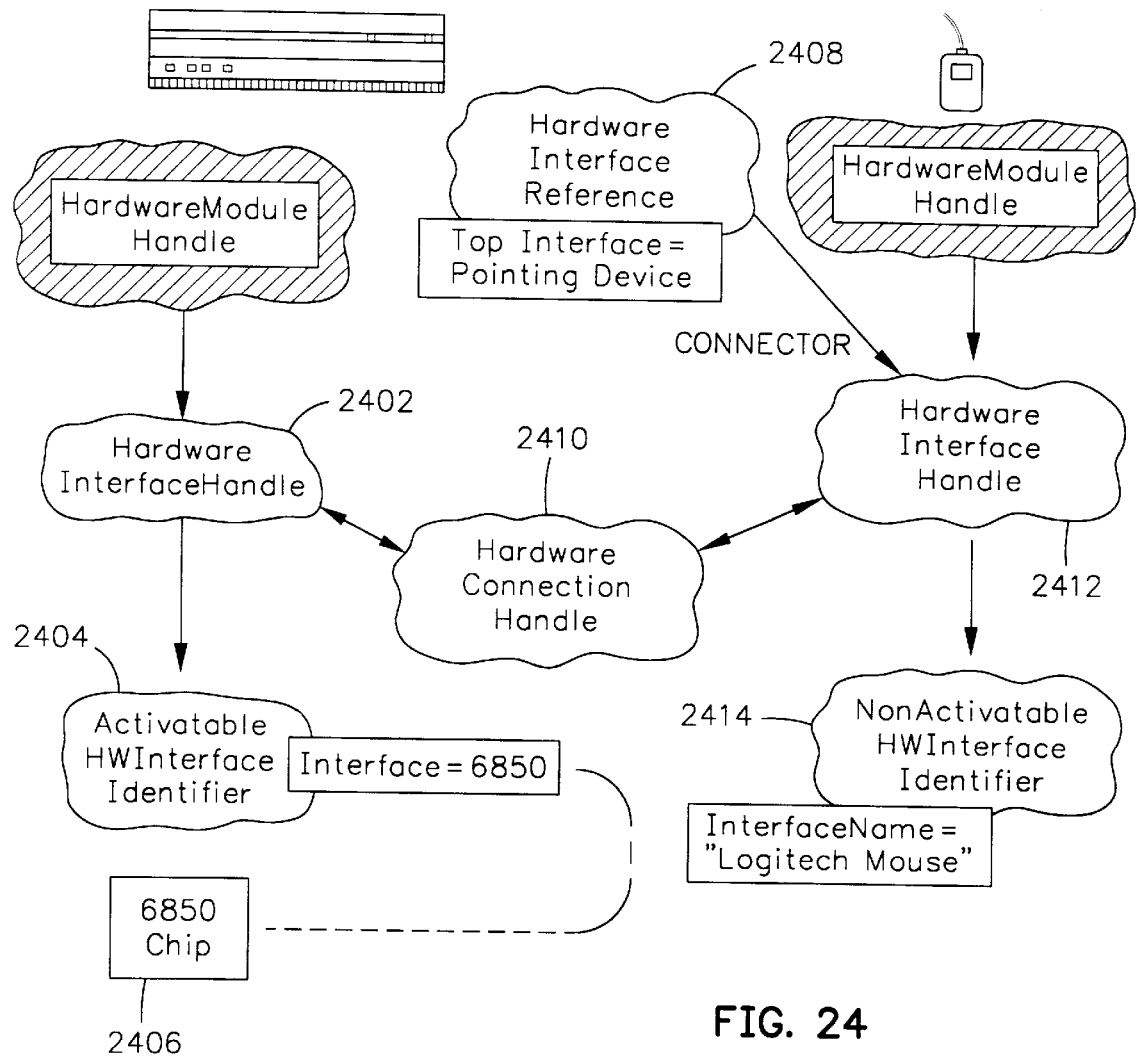
FIG. 24 is an overview of the hardware configuration for stack description creation for a mouse.

FIG. 24 is an overview of the hardware configuration for this scenario: the THardwareInterfaceReference object 2408, the mouse's connector 2412, the mouse's HardwareInterfaceIdentifier object 2414, the connection object 2410, the port the mouse is connected to 2402, the port's HardwareInterfaceIdentifier object 2404 and the "metal" 2406.

(1) The first step the THardwareInterfaceReference object must perform, in order to create the stack description, is to get the "bottom" interface. This is exactly the same as the previous scenario.

(2) The second step is to get the InterfaceName, which is used to specify the "top" interface, from the interface identifier object 2414. This is accomplished by accessing the connector object 2412 and retrieving the identifier object, then calling GetInterfaceName.

(3) At this point, we know the top interface "LogiTech-Mouse" and the bottom interface of our service stack ("6850"). The next step involves searching through the file system looking for the set of services which can be joined to form the required service stack.

The top description is tested to ensure that it is a subclass of the class specified by the TopInterface name attribute of the interface reference.

Figure 25:
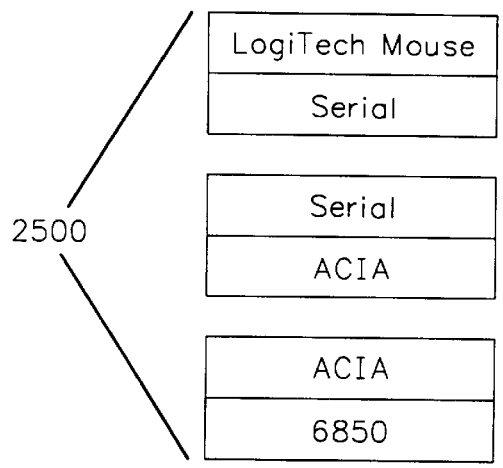
FIG. 25 shows the calculated stack "description" for THardwareInterfaceReference object.

(4) FIG. 25 shows the calculated stack "description" 2500 for THardwareInterfaceReference object.

Create Stack Description—Serial Port via Switch Box

Scenario: The Interface Reference framework works with switch boxes. This scenario demonstrates only the first stage (i.e. creation of the stack description) for a printer connected to the serial port through a switch box.

A client has a TInterfaceReference pointer to an object whose actual subclass is THardwareInterfaceReference and whose top interface is set to "Printer". The client calls its Activate( ) method.

Figure 26:
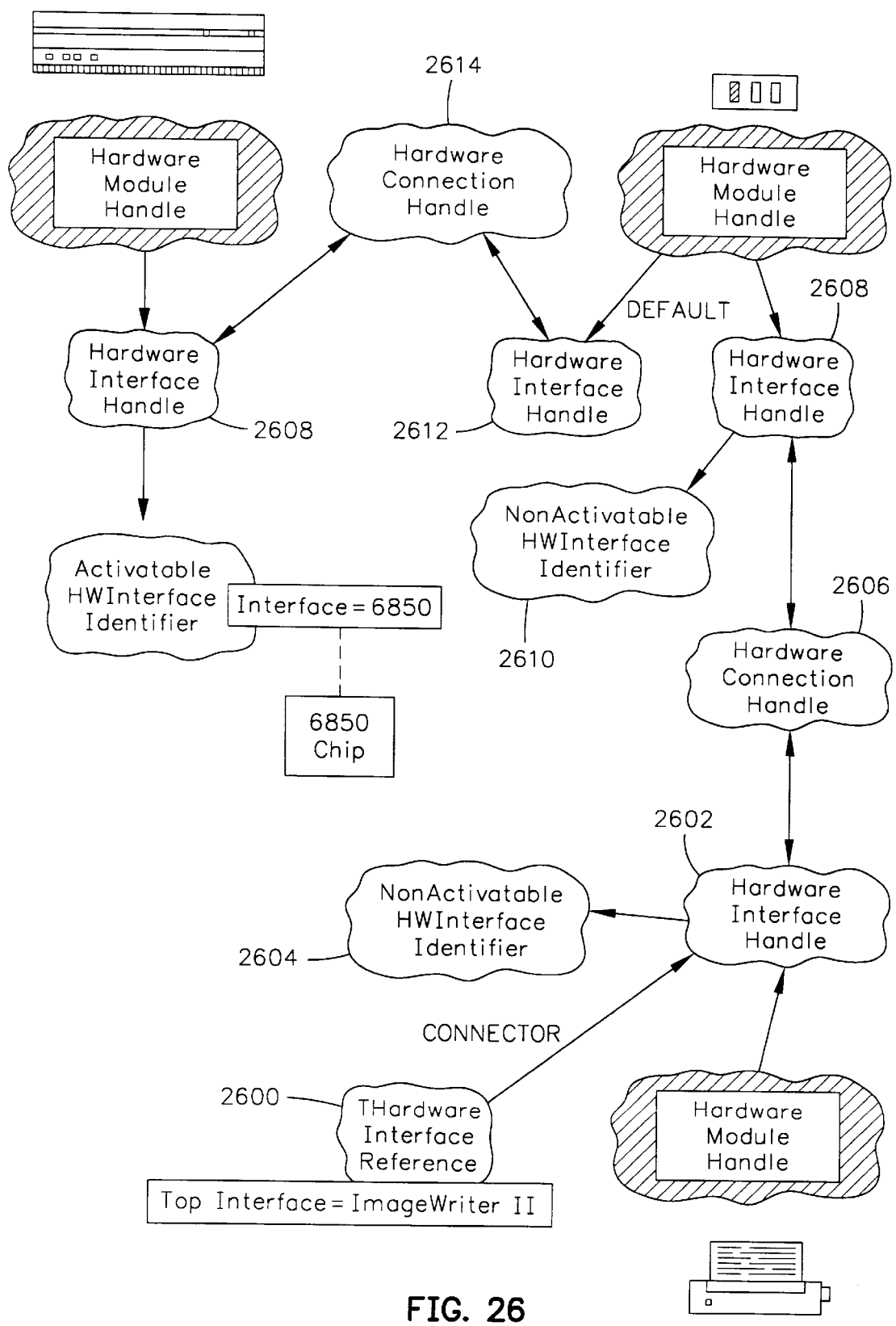
FIG. 26 is an overview of the hardware configuration for stack description creation for a serial port via a switch box.

FIG. 26 is an overview of the hardware configuration for this scenario: the THardwareInterfaceReference object 2600, the printer's connector 2602 (an attribute of the THardwareInterfaceReference object), the printer's HardwareInterfaceIdentifier object 2604 a connection object 2606, a connector on the switch box 2608, a switch box connector's HardwareInterfaceIdentifier object 2610, the switch box's default connector 2612, a connection object 2614, and the port the switch box is connected to 2616.

(1) The first step the THardwareInterfaceReference object must perform, in order to create the stack description, is to get the "bottom" interface. It does this by navigating across THardwareInterfaceHandle objects until it finds a THardwareInterfaceIdentifier object which can be activated.

Although FIG. 26 looks complicated, it really isn't. The process is a simple repetition of the earlier scenario involving a straight serial port.

The bottom interface is found as follows. First, access the THardwareInterfaceReference object's connector attribute 2602. Next, retrieve the HardwareInterfaceIdentifier object 2604 and test it. It can not be activated, so we continue. Next, we retrieve the connection object 2606 from the printer's connector. The switch box HardwareInterface object 2608 is retrieved from the connection object. The HardwareInterfaceIdentifier object retrieved can not be activated.

We have now completed one full pass through a THardwareConnectionHandle object, but did not find an interface identifier which could be activated.

What we must do now is create a service which can represent the device we got stuck on, element 2608. If a service can not be created for this device, then we fail. The device can be an automatic or a manual switch box. An automatic switch box requires a service which can control the switch box. A manual switch box requires a service also, only to be consistent.

To create this service, we create a THardwareInterfaceReference on the switch box's <u>default</u> THardwareInterfaceHandle object 2612. We set the top interface to MMultiplexer (or something appropriate we can define later). Next, we Activate it. This results in the continuation of the search for a "bottom" interface. It follows the connection object 2614 and ends up at the THardwareInterfaceHandle object 2616, which IS activatable. A valid bottom has been found.

The interface reference we created continues by creating a service stack for the switch box (note: this is not the service stack the client is interested in, we just got temporarily side tracked because of the switch box). At this point, we have a service which is an MMultiplexer. Developers of automatic switch boxes will have to supply this service themselves. For manual switch boxes, we can provide our own standard service which works for all manual switch boxes. We call Switch( ) on MMultiplexer, passing in the connector to switch to (i.e. 2608). The Switch method has the responsibility of setting the multiplexer to our connector (only if it's automatic). If it's a manual switch box, the user has the responsibility to push the proper button. If it is a manual switch box, a user alert could be optionally generated to remind the user to push the button on the manual switch box. This alert is only required when the serial port is accessing a different device from the previous activation (i.e., if we are activating for the modem a second time in a row, then the user doesn't need to do anything).

At this point, we can assume that the switch box has been switched to the appropriate position. We get the "bottom" interface from the MMultiplexer and delete the MMultiplexer service stack. We no longer need it. We only used it to get the bottom interface and to perform the switch. We now have the proper bottom interface from which to construct the client's service stack.

Create Stack Description—SCSI Device

Scenario: The Interface Reference framework works for auto-configurable devices too. This scenario demonstrates the first stage (i.e. creation of the stack description) for a printer connected to the SCSI port. In this example, the client wants to talk to the SCSI device, not the port. A different scenario is possible, which would create a service stack for the port. The computer viewer does this when the user asks it to refresh the SCSI port.

A client has a TInterfaceReference pointer to an object whose actual subclass is THardwareInterfaceReference and whose top interface is set to "Printer". The client calls its Activate( ) method.

Figure 27:
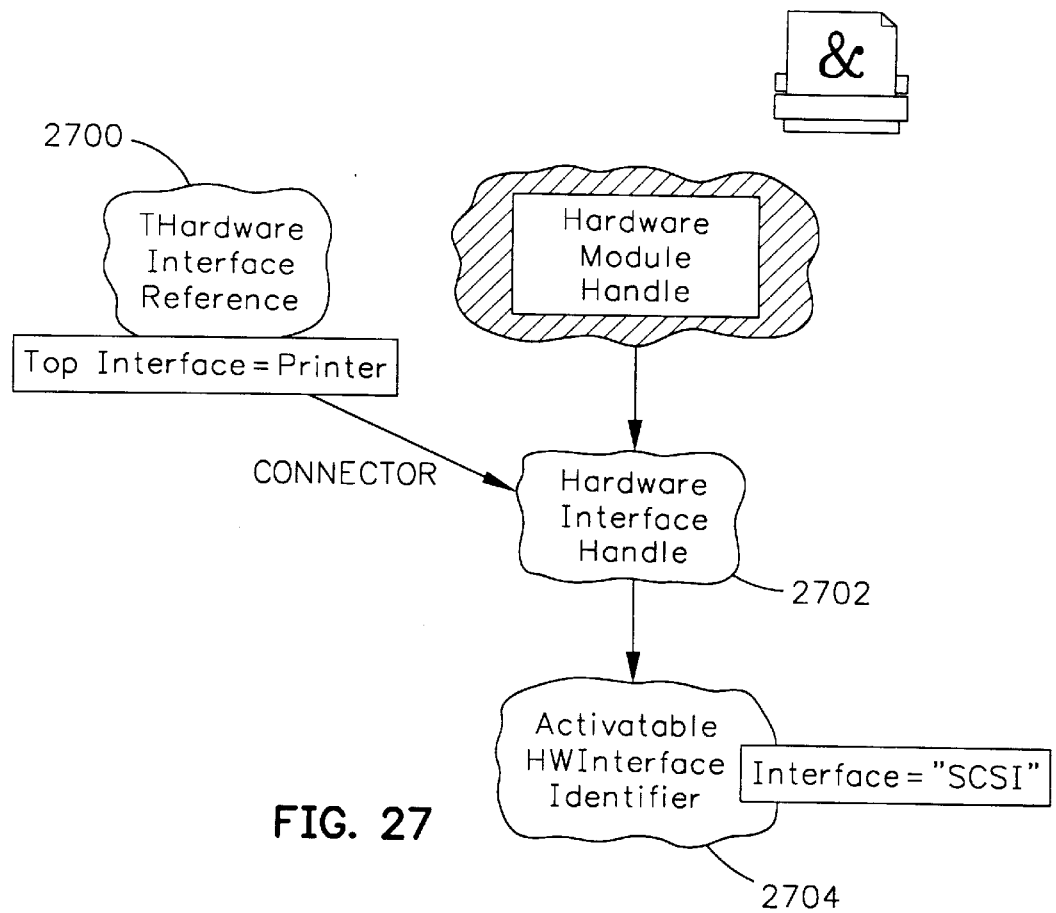
FIG. 27 is an overview of the hardware configuration for SCSI stack description creation.

FIG. 27 is an overview of the hardware configuration for this scenario: the THardwareInterfaceReference object 2700, the printer's connector 2702 (an attribute of the THardwareInterfaceReference object), and the printer's HardwareInterfaceIdentifier object 2704.

(1) The first step the THardwareInterfaceReference object must perform, in order to create the stack description, is to get the "bottom" interface. It does this by navigating across THardwareInterfaceHaindle objects until it finds a THardwareInterfaceIdentifier object which can be activated.

The bottom interface is found by accessing the THardwareInterfaceReference object's connector attribute 2702. Then the THardwareInterfaceIdentifier object 2704 is retrieved from it. Next, the HardwareInterfaceIdentifier object is tested. Since it can be activated, we are done. The ID specifies "SCSI" as the Bottom Interface.

(2) At this point, we know the very Top and the very Bottom interface of our service stack. The next step involves searching through the file system looking for the set of services which can be joined to form the required service stack. Note: The SCSI interface identifier is passed into the bottom service. The SCSI identifier contains a SCSI device handle which the bottom service can get and use to talk to the SCSI printer.

Activate a TNetworkInterfaceReference

Scenario: For a TNetworkInterfaceReference object whose "Top Interface" is set to "Printer", a client calls its Activate( ) method. Activation occurs in two stages:

(I) Creation of the stack description and (II) creation of the stack (I) Creation of the stack description (1) The first step the TNetworkReference object must perform in order to create the stack description is to set the "bottom" interface to "MessageStream".

(2) At this point, we know the very Top and the very Bottom interface of our service stack. The rest of this stage plays out exactly like THardwareInterfaceReference.

(II) Creation of the stack

The TNetworkReference object creates the stack in the following order:

The TNetworkReference object creates the bottom most TInterfaceMaker object in the stack description (a TNetworkMaker object).

The TNetworkReference object activates it, passing in the TServiceReference object.

The TInterfaceMaker object creates its corresponding service (can be derived from anything).

The TInterfaceMaker object calls its initializing function f( ), passing in the same TServiceReference.

Network service stacks can be deeper than one level.

Instantiate a THardwareInterfaceReference

Scenario: The computer viewer has a THardwareModuleHandle object and has created its corresponding model object. Now it is ready to create and add THardwareInterfaceReference objects f( ) the model, one for each THardwareInterfaceHandle object owned by the THardwareModuleHandle object.

(1) First, it creates an iterator for the THardwareInterfaceHandle objects (i.e. connectors) in the THardwareModuleHandle object.

(2) Next, for each THardwareInterfaceHandle object returned by the iterator, it creates and adds a THardwareInterfaceReference object to the model as follows:
theModel.AddInterfaceReference(THardwareInterfaceReference(aHardwareInt erface));

Instantiate a TNetworkInterfaceReference

Scenario: Network Browser issue.

Use a Manually Connected Device (configured via "Let Resources Find You")

Figure 28:
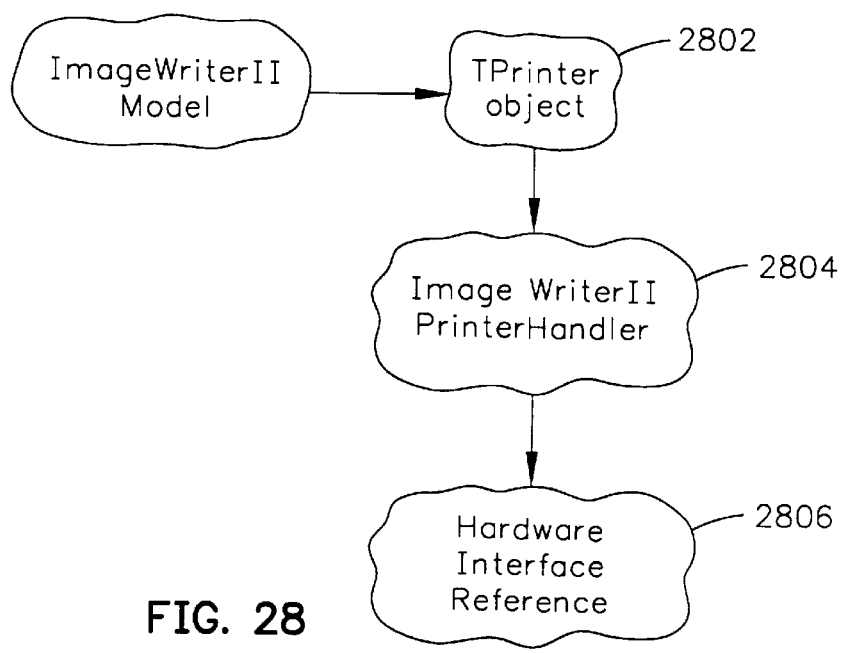
FIG. 28 is an example of how THardwareInterfaceReference can be used by the printer framework for an ImageWriterII.

Scenario: A user prints a document using a printer connected to the local serial port. This scenario illustrates an example of how THardwareInterfaceReference can be used by the printer framework for an ImageWriterII. FIG. 28 illustrates the scenario.

(1) A user drags a document icon onto an ImageWriter icon.

(2) The printer icon accepts the document icon. The document and the printer collaborate resulting in the creation of a print job which is added to the TPrinter object 2802 representing the ImageWriter.

(3) The PrinterHandler object 2804 calls Activate on the THardwareInterfaceReference object 2806 which was passed down from the TPrinter object 2802.

(4) The THardwareInterfaceReference object creates the appropriate service stack and returns a reference to it.

Use a Manually Connected Device (configured via "You find the Resource")

Scenario: Someone wants to query the computer hardware database for an ImageWriter and access it.

(1) Search the computer hardware database for the THardwareModuleHandle object which has "AppleImageWriterII" as its signature.

(2) Get the proper THardwareInterfaceHandle object from the THardwareModuleHandle object.

(3) Create a THardwareInterfaceReference, passing in the THardwareInterfaceHandle object.

(4) Set the top interface of the THardwareInterfaceReference object.

(5) Activate the reference object and begin communication with the ImageWriter II.

Change a Connection of a Manually Connected Device

Scenario: This scenario demonstrates that a document, whose default printer is a particular local ImageWriter, maintains its ability to print to that printer even after the user has changed the printer's connection. Please refer to the "Low-Level Hardware Configuration ERS" for this scenario.

3.3.12 Developer creates a new service

Scenario: Show the classes necessary to introduce two new services into Pink, using the mechanism defined in this ERS. The new services are: UART service for a TxyzUART and a UART service for a TpdqUART.

Figure 29:
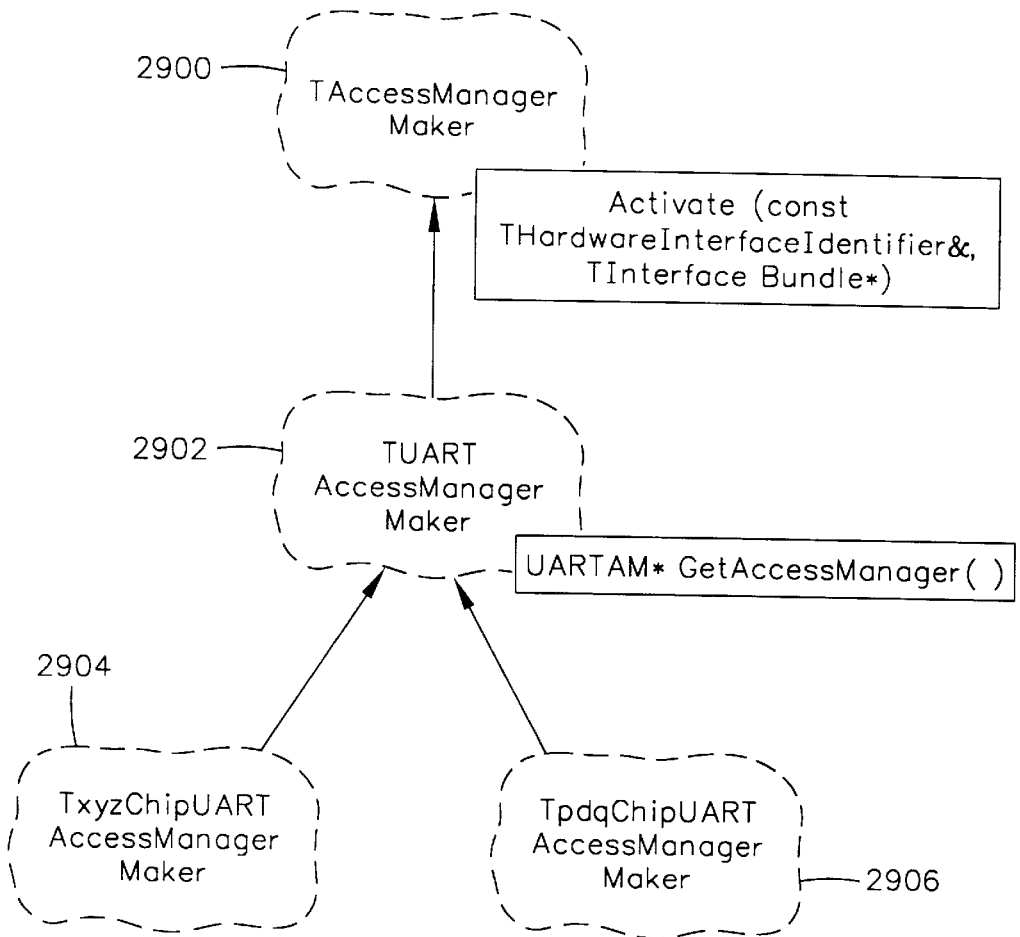
FIG. 29 illustrates Maker Class diagrams.

(1) FIG. 29 illustrates Maker Class diagrams.

Figure 30:
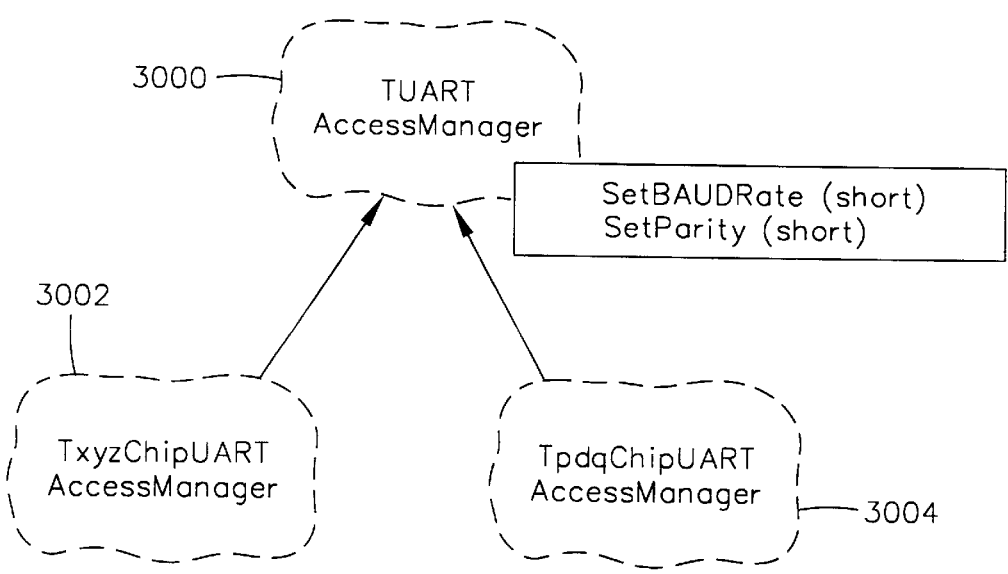
FIG. 30 illustrates Service Class diagrams.

(2) FIG. 30 illustrates Service Class diagrams. Note: there is a one-to-one correspondence between the maker classes and the service classes.

The shaded classes are written by the developer.

Class Interfaces

TInterfaceReference

Class Description

Purpose: Please refer to the above discussion for the purpose of this class, what an instance of this class represents, what this class is used for and the meaning of its attributes.

Deriving Classes: This class is polymorphic.

Concurrency: This class is not multi-thread safe.

Persistence: An instance of a subclass of TInterfaceReference may be saved to a file and restored at any time.

Interface:

```
#ifndef NO_SPI
class TInterfaceReference
{
    public:
    //..................................
    // Standard methods
    virtual void GetTopInterface(InterfaceName&) const;
    virtual void SetTopInterface(const InterfaceName&);
    virtual void GetBundles(TDictionary<InterfaceName,
        TInterfaceBundle>&) const;
    virtual void SetBundles(const TDictionary<InterfaceName,
        TInterfaceBundle>&);
    virtual void GetPossibleTops(TCollection<InterfaceName>&) const;
    virtual TInterfaceMaker* Activate() = 0;
    //..................................
    // Special Operators
    virtual TStream& operator>>=(TStream& toWhere) const;
    virtual TStream& operator>>=(TStream& fromWhere);
    virtual ~TInterfaceReference();
    protected:
    //..................................
    // Constructors
    TInterfaceReference();
    TInterfaceReference(const TInterfaceReference& copyFrom);
    TInterfaceReference& operator=(const TInterfaceReference&
        copyFrom);
    private:
};
#endif
```

Member Functions void GetTopInterface(InterfaceName&) const

Gets the top interface of this InterfaceReference. Clients will rarely call this method.

void SetTopInterface(const InterfaceName&)

This method specifies the interface of the service that you want Activate to return. Clients must call this method sometime before they call Activate.

void GetBundles(TDictionary<InterfaceName, TInterfaceBundle>&)

Fills up the collection argument with all of the TInterfaceBundle objects in this InterfaceReference. Does not empty the dictionary first. Clients will rarely call this method.

void SetBundles(const TDictionary<InterfaceName, TInterfaceBundle>&)

Deletes the current Bundles attribute in this InterfaceReference, then copies (clones) the given TDictionary [13] object and makes it the new Bundles attribute. Subsequent activations of this InterfaceReference use the new Bundles attribute. Clients call this method if the services they activate require service specific data. See the activate methods of the maker subclasses for more details.

void GetPossibleTops(TCollection<InterfaceName>&)

Fills up the collection argument with all of the InterfaceName objects that this InterfaceReference can currently support, given the current "installed" services on the system. Each InterfaceName object in the collection identifies one type of supported service. Clients may call this method to determine what services are available for a given InterfaceReference. The computer viewer uses this method during type negotiation between connectors. For example, a user attempting to connect an ImageWriter to a SCSI port will be prevented from doing so if the InterfaceReference does not say serial is supported by the SCSI port.

TInterfaceMaker

Activate( ) =0

This method creates a service stack whose top service has an interface specified by SetTopInterfaceo. The bottom resource is subclass dependent. It could be a hardware component, a network service or a software service. This method is called directly by clients. A pointer to a TInterfaceMaker object, of the specified type, is returned. Clients down-cast this pointer to the appropriate type and get a pointer to the real service object. After this has been done, the client is required to delete the TInterfaceMaker object.

TStream& operator>>=(TStream& toWhere) const

Streams out the entire interface reference object into the toWhere argument.

TStream& operator<<=(TStream& fromWhere)

Streams in the entire interface reference object from the fromWhere argument.

~THardwareInterfaceReference( )

Destroys the interface reference object only. It does not affect the activated service(s), if any.

THardwareInterfaceReference( )

Subclasses may call to create an empty THardwareInterfaceReference object.

THardwareInterfaceReference(const THardwareInterfaceReference& copyFrom)

Subclasses call (copy constructor).

THardwareInterfaceReference& operator=(const THardwareInterfaceReference& copyFrom) Subclasses call.

Network Interface Reference

Class Description

Purpose: Please refer to section 3.2 for the purpose of this class, what an instance of this class represents, what this class is used for and the meaning of its attributes.

Deriving Classes: This class is polymorphic.

Concurrency: This class is not multi-thread safe.

Persistence: An instance of a TNetworkInterfaceReference may be saved to a file and restored at any time.

Interface:

```
#ifndef NO_SPI
class TNetworkInterfaceReference : public TInterfaceReference
{
  public:
    //..................
    // Constructors & Destructor
```

-continued

```
    TNetworkInterfaceReference();
    TNetworkInterfaceReference(const TServiceReference&);
    virtual ~TNetworkInterfaceReference();
    TNetworkInterfaceReference(const TNetworkInterfaceReference&
      copyFrom);
    TNetworkInterfaceReference& operator=(const
      TNetworkInterfaceReference&
copyFrom);
    //..................
    // Standard methods
    virtual TServiceReference* CreateServiceReference() const;
    virtual void SetServiceReference(const TServiceReference&);
    //..................
    // Overrides
    virtual TInterfaceMaker* Activate();
    virtual TStream& operator>>=(TStream& toWhere) const;
    virtual TStream& operator<<=(TStream& fromWhere);
  protected:
  private:
};
#endif
```

Member Functions

TNetworkInterfaceReference( )

Creates a default interface reference for a service connected to a network. The object must be given a "top" interface name and a service reference before Activate is called, or else an exception will be generated. Useful for streaming.

TNetworkInterfaceReference(const TServiceReference&)

Creates an interface reference for a service connected to a network and is represented by the given service reference object. The object must be given a "top" interface name before Activate is called, or else an exception will be generated.

~TNetworkInterfaceReference( )

Destroys this interface reference object; but does not affect the activated service(s), if any.

TNetworkInterfaceReference(const TNetworkInterfaceReference& copyFrom)

Copies the entire interface reference object from the copyFrom argument into this object.

TNetworkInterfaceReference& operator=(const TNetworkInterfaceReference& copyFrom)

Copies the entire interface reference object from the copyFrom argument into this object.

TServiceReference

CreateServiceReference( ) const

Creates and returns a copy of the Service Reference attribute in this NetworkInterfaceReference. Client adopts returned object. Clients are not expected to use this method[1].

void SetServiceReference(const TServiceReference&)

Sets the Service Reference attribute in this NetworkInterfaceReference. Creators of NetworkInterfaceReference objects use this method to specify the network service providing the service.

TInterfaceMaker

Activate( )

This method creates a service stack for an entity on a network, whose top service has an interface specified by SetTopInterface( ). This method is called directly by clients. A pointer to a TInterfaceMaker object, of the specified type, is returned. Clients down-cast this pointer to the appropriate type and get a pointer to the real service object. After this has been done, the client is required to delete the TInterfaceMaker object.

TStream& operator>>=(TStream& toWhere) const

Streams out the entire interface reference object into the toWhere argument.

TStream& operator<<=(TStream& fromWhere)
Streams in the entire interface reference object from the fromWhere argument.
THardwareInterfaceReference
Class Description
Purpose:Please refer to section 3.2 for the purpose of this class, what an instance of this class represents, what this class is used for and the meaning of its attributes.
Deriving Classes: This class is polymorphic.
Concurrency: This class is not multi-thread safe.
Persistence: An instance of a THardwareInterfaceReference may be saved to a file and restored at any time.

```
#ifndef NO_SPI
class THardwareInterfaceReference : public TInterfaceReference
{
public:
    //................................
    // / Constructors & Destructor
    THardwareInterfaceReference();
    THardwareInterfaceReference(const THardwareInterfaceHandle&);
    THardwareInterfaceReference(const THardwareInterfaceIdentifier&);
    virtual ~THardwareInterfaceReference();
    THardwareInterfaceReference(const THardwareInterfaceReference&
    copyFrom);
    THardwareInterfaceReference& operator=(const
    THardwareInterfaceReference&
copyFrom);
    //................................
    // / Standard methods
    virtual void SetTopInterface(const InterfaceName&,
    Boolean useConnectorName);
    virtual THardwareInterfaceHandle GetConnector() const;
    virtual void SetConnector(const THardwareInterfaceHandle&);
    //................................
    // / Overrides
    virtual void SetTopInterface(const InterfaceName&);     // c++
    syntax requireme:
    virtual TInterfaceMaker* Activate();
    virtual TStream& operator>>=(TStream& toWhere) const;
    virtual TStream& operator<<=(TStream& fromWhere);
protected:
private:
};
#endif
```

Member Functions
THardwareInterfaceReference( )
Creates a default interface reference for a service provided by a device connected to a local computer. The object must be given a "top" interface name and a THardwareInterfaceHandle before Activate is called, or else an exception will be generated. Useful for streaming.
THardwareInterfaceReference(const THardwareInterfaceHandle&)
Creates an interface reference for a service provided by a device connected to a local computer. The device is identified by the given hardware interface handle. The object must be given a "top" interface name before Activate is called, or else an exception will be generated.
THardwareInterfaceReference(const THardwareInterfaceIdentifier&)
Creates an interface reference for a service provided by a device connected to a local computer. The device is identified by the given hardware interface identifier. The object must be given a "top" interface name before Activate is called, or else an exception will be generated.
~THardwareInterfaceReference ( )
Destroys this interface reference object, but does not affect the activated service(s), if any.
THardwareInterfaceReference(const THardwareInterfaceReference& copyFrom)
Copies the entire interface reference object from the copyFrom argument into this object.

THardwareInterfaceReference& operator=(const THardwareInterfaceReference& copyFrom)
Copies the entire interface reference object from the copyFrom argument into this object.
void SetTopInterface(const InterfaceName&, Boolean UseConnectorName)
This method specifies the interface of the top service object that you want Activate to return. If the UseConnectorName argument is TRUE, then the top InterfaceName argument will be treated as a base class name (for type checking) and the real "top" interface name of the service stack will be retrieved from the connector. If the UseConnectorName argument is FALSE, then this method behaves as the normal SetTopInterface method.
THardwareInterfaceHandle GetConnector( ) const
Returns a copy of the Connector attribute in this HardwareInterfaceReference. The Connector attribute represents the connector on the physical hardware which actually provides the service (e.g. the connector on the back of a StyleWriter). This connector is connected to a port which drives the service (e.g. the serial port on a PC motherboard). Clients will rarely, if ever, use this method. HardwareInterfaceReference uses it to determine the bottom interface.
void SetConnector(const THardwareInterfaceHandle&)
Sets the Connector attribute in this HardwareInterfaceReference. Creators of HardwareInterfaceReference objects use this method to specify the connector on the physical hardware which actually provides the service (e.g. the connector on the back of a StyleWriter).
TInterfaceMaker
Activate( )
This method creates a service stack for a device connected to a local computer, whose top service has an interface specified by SetTopInterface( ). This method is called directly by clients. A pointer to a TInterfaceMaker object, of the specified type, is returned. Clients down-cast this pointer to the appropriate type and get a pointer to the real service object. After this has been done, the client is required to delete the TInterfaceMaker object.
TStream& operator>>=(TStream& toWhere) const
Streams out the entire interface reference object into the toWhere argument.
TStream& operator<<=(TStream& fromWhere)
Streams in the entire interface reference object from the fromWhere argument.
TInterfaceMaker
Class Description
Purpose: Please refer to section 3.2 for the purpose of this class, what an instance of this class represents, what this class is used for and the meaning of its attributes.
Deriving Classes: This class is polymorphic.
Concurrency: This class is not multi-thread safe.
Persistence: Interface Makers are not persistent.
Interface:

```
#ifndef NO_SPI
class TInterfaceMaker
{
public:
    //................................
    // / Destructor
    virtual ~TInterfaceMaker();
    protected:
    //................................
    // / Constructors
    TInterfaceMaker();
    TInterfaceMaker(const TInterfaceMaker& copyFrom);
```

```
    TInterfaceMaker& operator=(const TInterfaceMaker& copyFrom);
  private:
};
#endif
```

Member Functions
~TInterfaceMaker( )
  Destroys this interface maker object.
TInterfaceMaker( )
  Creates a default interface maker for an interface maker subclass.
TInterfaceMaker(const TInterfaceMaker& copyFrom)
  Copies the entire interface maker object from the copy-From argument into this object.
TInterfaceMaker& operator=(const TInterfaceMaker& copyFrom)
  Copies the entire interface maker object from the copy-From argument into this object.
TUpperInterfaceMaker
Class Description
  Purpose: Please refer to section 3.2 for the purpose of this class, what an instance of this class represents, what this class is used for and the meaning of its attributes.
    Deriving Classes: This class is polymorphic.
    Concurrency: This class is not multi-thread safe.
    Persistence: Interface Makers are not persistent.
    Interface:

```
#ifndef    NO_SPI
class TUpperInterfaceMaker : public TInterfaceMaker
{
  public:
    //....................
    // Standard methods
    virtual void Activate(const TInterfaceMaker& below, const
      TInterfaceBundle&) = 0;
    //....................
    // Destructor
    virtual ~TUpperInterfaceMaker();
  protected:
    //....................
    // Constructors
    TUpperInterfaceMaker();
    TUpperInterfaceMaker(const TUpperInterfaceMaker& copyFrom);
    TUpperInterfaceMaker& operator=(const TUpperInterfaceMaker&
      copyFrom);
  private:
};
#endif
```

Member Functions
virtual void Activate(const TInterfaceMaker& below, const TInterfaceBundle&)=0
  Subclasses know what "real" service object to make. This method is called by a TInterfaceReference object, passing in the below interface maker object. The subclass down-casts it and asks it for the real below service. The real below service is then given to the service object created by the interface maker subclass. If the TInterfaceReference object has a TInterfaceBundle associated with the top interface corresponding to this maker, then the TInterfaceReference object will pass it into this function. If the given TInterfaceBundle pointer is not nil, then the callee can safely down-cast it to the type it expects. This object contains special service specific information (e.g. BAUD rate).
~TUpperInterfaceMaker( )
  Destroys this interface maker object.
TUpperInterfaceMaker( )
  Creates a default interface maker for an upper interface maker subclass.
TUpperInterfaceMaker(const TUpperInterfaceMaker& copyFrom)
  Copies the entire interface maker object from the copyFrom argument into this object.
TUpperInterfaceMaker& operator=(const TUpperInterfaceMaker& copyFrom)
  Copies the entire interface maker object from the copyFrom argument into this object.
TAccessManagerMaker
Class Description
  Purpose: Please refer to the above discussion for the purpose of this class, what an instance of this class represents, what this class is used for and the meaning of its attributes.
    Deriving Classes: This class is polymorphic.
    Concurrency: This class is not multi-thread safe.
    Persistence: Interface Makers are not persistent.
    Interface:

```
#ifndef    NO_SPI
class TAccessManagerMaker : public TInterfaceMaker
{;
  public:
    //....................
    // Standard methods
    virtual void Activate(const THardwareInterfaceIdentifier& theMetal,
      const TInterfaceBundle&) =0;
    //....................
    // Destructor
    virtual ~TAccessManagerMaker();
  protected:
    //....................
    // Constructors
    TAccessManagerMaker();
    TAccessManagerMaker(const TAccessManagerMaker& copyFrom);
    TAccessManagerMaker& operator=(const TAccessManagerMaker&
      copyFrom);
  private:
};
#endif
```

Member Functions
virtual void Activate(const THardwareInterfaceIdentifier& theMetal, const TInterfaceBundle&)=0
  Subclasses know what "real" Access Manager object to make. This method is called by a TInterfaceReference object, passing in the THardwareInterfaceIdentifier object. This is given to the AccessManager object created by the AccessManagerMaker subclass. The bundle parameter follows the same rules as specified for TUpperInterfaceMaker::Activate.
~TAccessManagerMaker( )
  Destroys this access manager maker object.
TAccessManagerMaker( )
  Creates a default access manager maker for an upper interface maker subclass.
TAccessManagerMaker(const TAccessManagerMaker& copyFrom)
  Copies the entire access manager maker object from the copyFrom argument into this object.
TAccessManagerMaker& operator=(const TAccessManagerMaker& copyFrom)
  Copies the entire access manager maker object from the copyFrom argument into this object.
TInterfaceBundle
Class Description
  Purpose: Please refer to the discussion above for the purpose of this class, what an instance of this class represents, what this class is used for and the meaning of its attributes.

Deriving Classes: This class is polymorphic.
Concurrency: This class is not multi-thread safe.
Persistence: Interface Bundles are persistent.
Interface:

```
#ifndef NO_SPI
class TInterfaceBundle
{
  public:
    //.....................................
    // Destructor
    virtual ~TInterfaceBundle();
    //.....................................
    // Special Operators
    virtual TStream& operator>>=(TStream& toWhere) const;
    virtual TStream& operator<<=(TStream& fromwhere);
  protected:
    //.....................................
    // Constructors
    TInterfaceBundle();
    TInterfaceBundle(const TInterfaceBundle& copyFrom);
    TInterfaceBundle& operator=(const TInterfaceBundle& copyFrom);
  private:
};
#endif
```

Member Functions
~TInterfaceBundle( )
  Destroys this interface bundle object.
TInterfaceBundle( )
  Creates a default interface bundle for an interface bundle subclass.
TStream& operator>>=(TStream& toWhere) const
  Streams out the entire interface bundle object into the toWhere argument.
TStream& operator<<=(TStream& fromWhere)
  Streams in the entire interface bundle object from the fromWhere argument.
TInterfaceBundle(const TInterfaceBundle& copyFrom)
  Copies the entire interface bundle object from the copyFrom argument into this object.
TInterfaceBundle& operator=(const TInterfaceBundle& copyFrom)
  Copies the entire interface bundle object from the copyFrom argument into this object.

It is possible that more than one stack description may be generated during an Activate. There are multiple paths through the sea of service stacks which can adequately provide the requested top service on the desired device ID. Some heuristic will resolve and select one stack. Clients, for example time-based media, may be very interested in the middle layers for the various stack choices. Characteristics of these layers may need to be figured into the equation and preferences solicited for use in the selection.

If a mouse device is not registered (related to the dead mouse issue), there must be the ability to create a driver for the mouse. Two possible solutions:

(1) Register mouse device, Activate the reference, Unregister the mouse.

(2) CAM creates the driver when it detects the mouse moving.

It may be desirable to delay creation of a service until the point where it is required. For example, delaying the creation of a printer service for an ImageWriter, until the point that a user drags a document orito the printer. Or, the service could be created immediately upon discovery that an ImageWriter is connected. The preferred embodiment allows clients to make either choice. Setting the BAUD rate for a serial ImageWriter is performed by storing service specific parameters in bundles stored in a TDictionary stored in the model. They copy the dictionary into their TInterfaceReference when they get it.

Design Decisions—Interface Maker

When clients first look at the TInterfaceReference class, they see an abstraction which is capable of creating and returning a particular type of service. Unfortunately, TInterfaceReference obscures what is seemingly a simple and commonplace operation by introducing a maker class. The affect on the client, is the addition of an extra step in order to access the service stack. Developers are burdened with extra implementation effort by being forced to code the maker class. Everyone is burdened with the extra mental effort required to understand the design.

Figure 31:
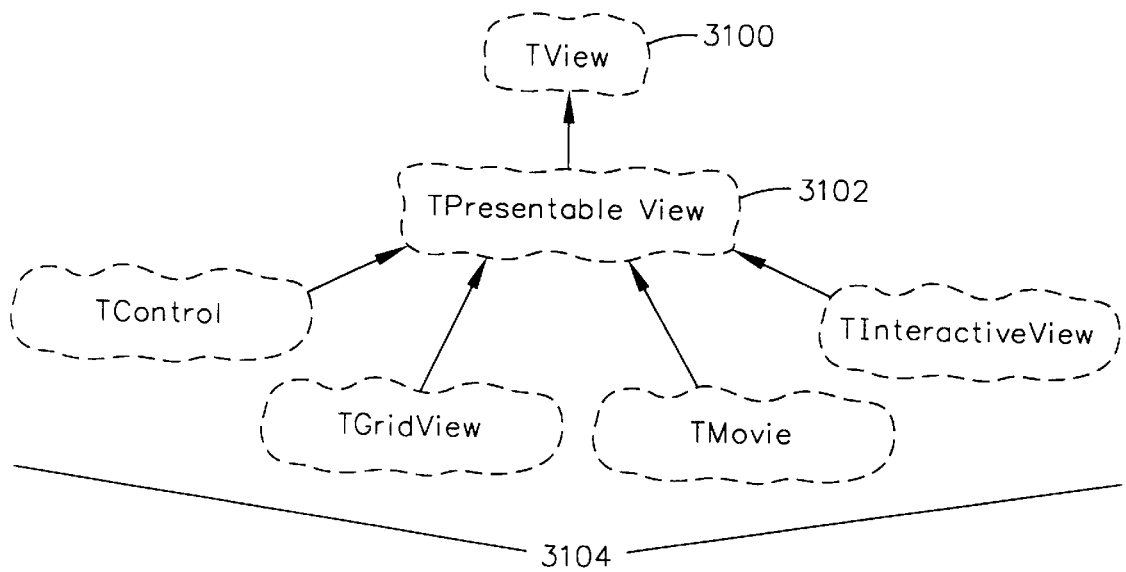
FIG. 31 shows the hierarchy of TPresentableViews.

There are reasons for having to deal with the extraneous maker classes, but there are several issues which must be discussed in order to obtain a full understanding of extraneous maker classes. First, we need to examine closely the hierarchy of TPresentableViews 3102, as shown in FIG. 31. TPresentableView 3102 is a subclass of TView 3100. TPresentableView 3102 is used to represent many views throughout the system (e.g. controls, editable text, grid views, interactive views, movies, panes, etc., shown collectively as 3104). There is a common abstraction among all view objects (e.g. drawing, transformations, notification, hit tests, nesting other views, etc.). This suggests a common base abstraction. Furthermore, views are used throughout much of the user interface system, which suggests a need for polymorphism.

Figure 32:
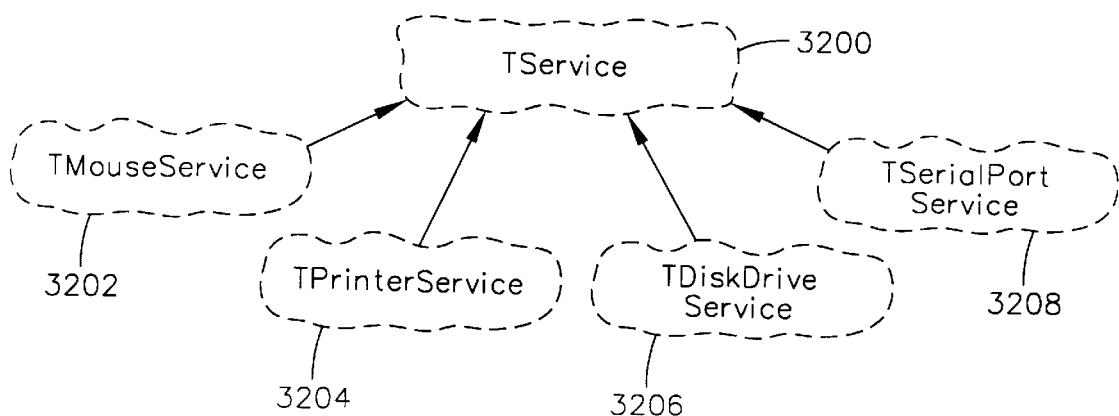
FIG. 32 shows the class hierarchy of services if a common class hierarchy was not avoided.

Now, lets examine service stacks. As stated above, it is desirable to avoid a common class hierarchy for services. If we rejected this goal, the service hierarchy would be required to look as shown in FIG. 32. There is no commonality between a disk driver associated with 3206, a serial port driver associated with 3208 a Printer associated with 3204, or a mouse driver associated with 3202. There is no requirement for polymorphism. Service stacks are not going to be passed around to various parts of the system. All polymorphic requirements are handled by the TInterfaceReference class. So, the advantages of requiring a common abstraction where none exists conceptually do not appear to out weigh the disadvantages.

Figure 33:
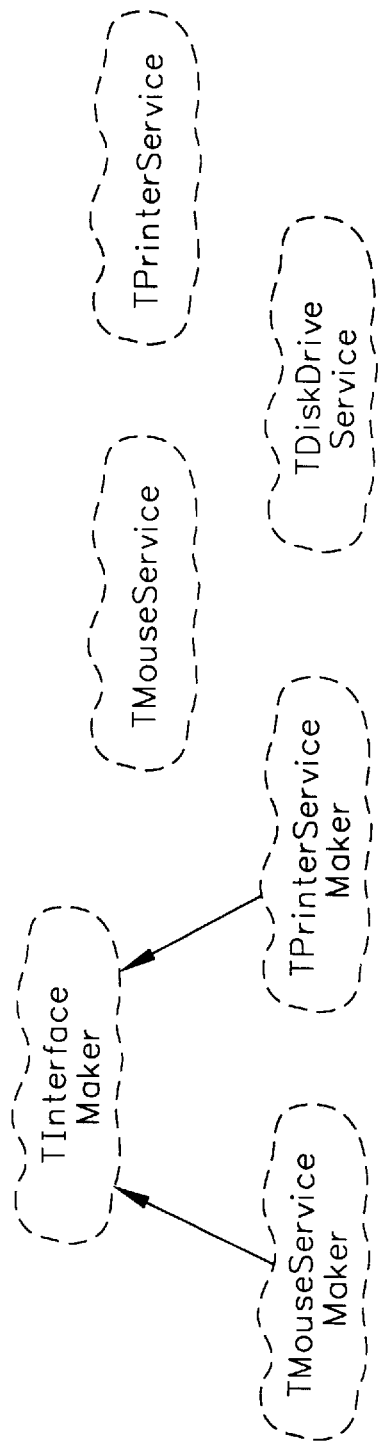
FIG. 33 and FIG. 34 together demonstrate the development of a maker.
Figure 34:
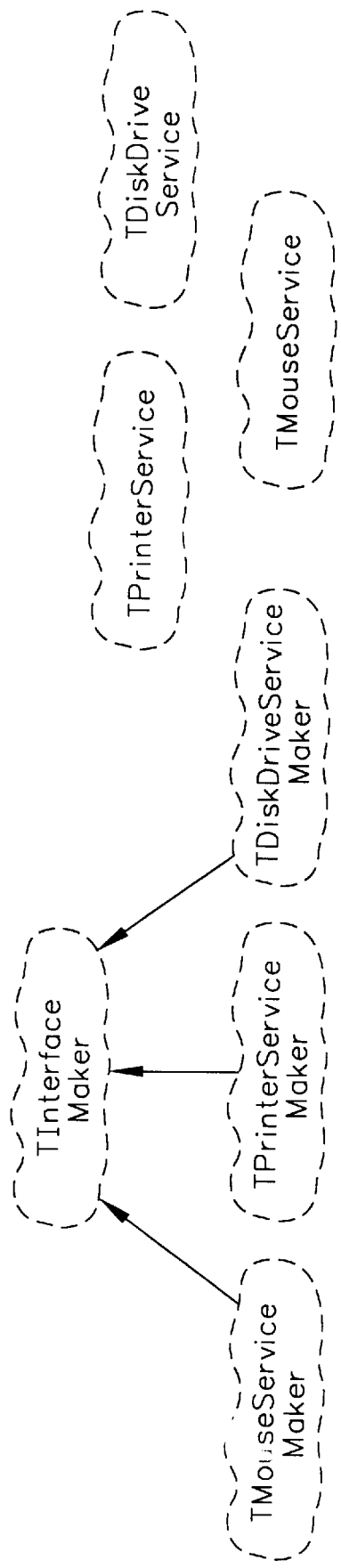

There is actually a positive side to the maker classes. Any service can be supported by the interface reference framework via the introduction of a maker. For example, if a service were created which was not expected to be used by an interface reference, a developer would not be prevented from using the service in a service stack. All the developer is required to do is write one maker class (much less work than writing the service from scratch or writing a wrapper). A wrapper would be required if there were no maker classes. This would imply that all services would have to derive from TService 3200. Since the class in question did not, the developer would wrap up the class in a TService derivative. FIG. 33 illustrates how easy it is for a developer to make any service work within the interface reference framework by adding one maker class. The disk drive service is not supported by the interface reference framework (at the time, no one thought it was necessary). In FIG. 34, however, the disk drive service is NOW supported by the interface reference framework (someone had a need, and a maker was developed).

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by letters patent is:

1. Apparatus for providing a service to a client upon a request by the client, the apparatus operating in a computer system having a processor, a memory, a locator means for dynamically locating service maker entities from within the computer system based on query parameters to create a service maker pool and a service device having a device protocol, and the apparatus comprising:

(a) means for creating a pool of service maker entities in the memorials with a predefined input communication protocol into output signals with another predefined output communication protocol;

(b) means responsive to the request for dynamically creating a stack description in the memory, including:
   means for creating a top service description which receives the request having a request protocol and translates the request protocol into signals with a first intermediate protocol,
   means for creating a bottom service description which receives signals with a second intermediate protocol and accesses the device according to the device protocol, and
   means for constructing an ordered list of service maker entities for translating signals with the first intermediate protocol into signals with the second intermediate protocol by selecting one or more service maker entities from the cool using the top service
   description and the bottom service description as query parameters to the locator means to dynamically locate service maker entities and matching the output communication protocol generated by a first selected service maker entity to the input communication protocol received by a second selected service maker entity;

(c) means for dynamically creating a service stack in the memory by using the stack description to sequentially instantiate service maker objects from the entities in the ordered list to form a chain of service maker objects that receives the request in one protocol and accesses the service in another protocol; and (d) means responsive to the request for providing service to the client by accessing the device through the service stack.

2. The apparatus of claim 1 wherein the service maker object creating means constructs each service maker object from one of a plurality of interface maker class definitions in the memory, each interface maker class definition including a top interface definition specifying one of the communication protocols and a bottom interface definition specifying another of the communication protocols.

3. The apparatus of claim 2 wherein the means for constructing an ordered list of service maker objects matches the bottom interface definition of one service maker object with the top interface definition of another service maker object to construct the ordered list.

4. The apparatus of claim 3 wherein the bottom service definition is associated with a particular device so that the particular device can be connected to the client by a plurality of different service maker object chains.

5. The apparatus of claim 4 wherein the program logic in each of the plurality of service maker objects is responsive to a bottom interface definition for down casting the bottom interface definition to a top interface definition by generating program logic for translating a bottom interface definition to a top interface definition.

6. A method for providing a service to a client upon a request by the client, the method operating in a computer system having a processor, a memory, and a service device having a device protocol, and the method comprising the steps of:

(a) using a locator means in the computer system for dynamically locating service maker entities from within the computer system based on query parameters to create a service maker pool in the memory, each of the service maker entities having program logic for translating input signals with a predefined input communication protocol into output signals with another predefined output communication protocol, (b) dynamically creating a stack description in the memory in response to the request, the stack description including:
   a top service description which receives the request having a request protocol,
   a bottom service description which receives signals with a second intermediate protocol and accesses the device according to the device protocol, and
   an ordered list of service maker entities for translating signals with the first intermediate protocol into signals with the second intermediate protocol constructed by using the top service description and the bottom service description as query parameters to the locator means to dynamically locate and select one or more service maker entities from the pool and matching the output communication protocol generated by a first selected service maker entity to the input communication protocol received by a second selected service maker entity, (c) dynamically creating a service stack in the memory by using the stack description to sequentially instantiate service maker objects from the entities in the ordered list to form a chain of service maker objects that receives the request in one protocol and accesses the service in another protocol; and (d) providing service to the client by accessing the device through the service stack.

7. The method of claim 6 wherein step (a) comprises the step of:

(a1) constructing each service maker object from one of a plurality of interface maker class definitions in the memory, each interface maker class definition including a top interface definition specifying one of the communication protocols and a bottom interface definition specifying another of the communication protocols.

8. The method of claim 7 wherein step (b) comprises the step of:

(b2) constructing an ordered list of service maker objects by matching the bottom interface definition of one service maker with the top interface definition of another service maker object.

9. The method of claim 8 wherein step (b) comprises the step of:

(b3) associating the bottom service definition with a particular device so that the particular device can be connected to the client by a plurality of different service maker object chains.

10. The method of claim 9 wherein step (c) comprises the step of:

(c1) down casting the bottom interface definition to a top interface definition by generating program logic for translating a bottom interface definition to a top interface definition.

11. A computer program product for providing a service to a client upon a request by the client, the computer program product operating with a computer system having a processor, a memory, and a service device having a device protocol, the computer program product comprising a computer usable medium having computer readable program code thereon, including:

program code which uses locator code for dynamically locating service maker entities from within the computer system based on query parameters to create a service maker pool in the memory, each of the service maker entities having program logic for translating input signals with a predefined input communication protocol into output signals with another predefined output communication protocol:

program code for dynamically creating a stack description in the memory in response to the request, the stack description including:

a top service description which receives the request having a request protocol, a bottom service description which receives signals with a second intermediate protocol and accesses the device according to the device protocol, and an ordered list of service maker entities for translating signals with the first intermediate protocol into signals with the second intermediate protocol by using the top service description and the bottom service description as query parameters passed to the locator code to dynamically locate and select one or more service maker entities from the pool and matching the output communication protocol generated by a first selected service maker entity to the input communication protocol received by a second selected service maker entity:

program code for dynamically creating a service stack in the memory by using the stack description to sequentially instantiate service maker objects from the entities in the ordered list to form a chain of service maker objects that receives the request in one protocol and accesses the service in another protocol, wherein the client can access the device through the service stack to obtain the service.

12. The computer program method of claim 11 wherein the program code for creating a pool of service maker entities comprises a plurality of interface maker class definitions for constructing each service maker object, each interface maker class definition including a top interface definition specifying one of the communication protocols and a bottom interface definition specifying another of the communication protocols.

13. The computer program product of claim 12 wherein the dynamically creating a stack description comprises program code for constructing an ordered list of service maker objects by matching the bottom interface definition of one service maker with the top interface definition of another service maker object.

14. The computer program product of claim 13 wherein the program code for dynamically creating a stack description comprises program code for associating the bottom service definition with a particular device so that the particular device can be connected to the client by a plurality of different service maker object chains.

15. The computer program product of claim 14 wherein the program code for dynamically creating a service stack comprises program code for down casting the bottom interface definition to a top interface definition by generating program logic for translating a bottom interface definition to a top interface definition.

* * * * *